United States Patent [19]

Cocca

[11] Patent Number: 4,980,709
[45] Date of Patent: Dec. 25, 1990

[54] CAMERA APPARATUS FOR PREVENTING INITIALIZATION OF EXPOSED FILM STORED IN A SELF-THRUSTING CASSETTE

[75] Inventor: J. David Cocca, Rochester, N.Y.

[73] Assignee: Eastman Kodak Company, Rochester, N.Y.

[21] Appl. No.: 492,037

[22] Filed: Mar. 12, 1990

[51] Int. Cl.[5] .................................................. G03B 1/18
[52] U.S. Cl. ............................... 354/173.1; 354/173.11
[58] Field of Search ......... 354/173.1, 173.11, 212–216

[56] References Cited

U.S. PATENT DOCUMENTS 4,310,233 1/1982 Okuyana et al. ..................... 354/212
4,401,379 8/1983 Tamamura et al. .................. 354/214
4,423,943 1/1984 Gold ..................................... 354/275

Primary Examiner—L. T. Hix
Assistant Examiner—Khanh Dang
Attorney, Agent, or Firm—Roger A. Fields

[57] ABSTRACT

In a camera to be used with a light-tight cassette which can be operated to automatically thrust a filmstrip out of the cassette whether the filmstrip is generally unexposed, partly exposed or substantially exposed, and which has a status indicator for providing a visible indication of the exposure status of the filmstrip, a film transport mechanism for operating the cassette is disabled whenever the cassette is inadvertently loaded in the camera with its status indicator indicating the filmstrip is substantially exposed.

5 Claims, 23 Drawing Sheets

LOAD ROUTINE

MIDROLL INTERRUPT (MRI) ROUTINE

CAMERA APPARATUS FOR PREVENTING INITIALIZATION OF EXPOSED FILM STORED IN A SELF-THRUSTING CASSETTE

CROSS-REFERENCE TO RELATED APPLICATION(S)

Reference is made to commonly assigned copending applications Ser. No. 07/492,038 entitled CAMERA APPARATUS FOR PREVENTING DOUBLE-EXPOSURE OF FILM RETURNED TO A SELF-THRUSTING CASSETTE, and filed Mar. 12, 1990, in the name of J. David Cocca; Ser. No. 07/436,265 entitled CAMERA APPARATUS FOR PREVENTING LEAD OF EXPOSED FILM, and filed Nov. 14, 1989 in the name of David C. Smart; Ser. No. 07/390,931 entitled CAMERA FOR USE WITH FILM CASSETTE HAVING FILM-EXPOSURE STATUS INDICATOR, and filed Aug. 8, 1989 in the names of David C. Smart and Dennis E. Baxter; and Ser. No. 07/436,266 entitled FILM CASSETTE WITH EXPOSURE STATUS INDICATOR, and filed Nov. 14, 1989 in the name of David C. Smart.

The forgoing applications cross-referenced above are incorporated (by reference) in this application.

BACKGROUND OF THE INVENTION

1. Field of the Invention

The invention relates generally to the field of photography, and Particularly to cameras. More specifically, the invention relates to apparatus in a camera for preventing initialization of exposed film, that is, for preventing an exposed filmstrip stored in a self-thrusting cassette from being advanced out of the cassette following inadvertent load of the cassette into the camera.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forwardmost portion of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is manually rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this nonslipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance the filmstrip out of the cassette shell by rotating the film spool in the unwinding direction. Moreover, the film leader is non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the forward or leading end of the filmstrip is slightly tapered to allow it to freely extend from between the circumferential lips and rest against the shell wall. During unwinding rotation of the film spool, the leading end of the filmstrip is advanced to and through a film passageway opening in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced to the outside of the cassette shell. In the patent, it is suggested that one manually rotate the film spool relative to the cassette shell until the film leader can be manually grasped and attached to a film advancing device in the camera. Thus, the camera is not used to rotate the film spool to advance the filmstrip from the cassette shell.

In conventional 35 mm film manufacturers' cassettes, after the filmstrip is completely exposed, the film spool is rotated in a winding direction to rewind the film leader into the cassette shell. Since the film leader cannot subsequently be advanced out of the cassette shell because of the binding effect between the film roll and the shell, this usually serves as an indication that the filmstrip is substantially exposed. Conversely, in the film cassette disclosed in U.S. Pat. No. 4,423,943, the film leader can be automatically advanced out of the cassette shell by rotating the film spool in the unwinding direction. This can be done regardless of whether the filmstrip is unexposed, substantially exposed or only partly exposed. Thus, the film cassette provides no indication as to the exposure status of the filmstrip, and therefore it might be re-loaded into a camera to double-expose the filmstrip.

THE CROSS-REFERENCED APPLICATIONS

Cross-referenced application Ser. No. 07/390,931 discloses a camera for use with a film cassette which is inherently capable of automatically advancing a filmstrip from the cassette shell whether the filmstrip is generally unexposed, partly exposed or substantially exposed. The film cassette has a film-exposure status indicator movable from an unexposed position for providing a visible indication that the filmstrip is generally unexposed, to a partly exposed position for providing a visible indication that the filmstrip is partly exposed, and to an exposed position for providing a visible indication that exposure of the filmstrip is completed. Since the camera is capable of returning the filmstrip to the cassette shell prematurely when the filmstrip is only partly exposed and of advancing the filmstrip from the cassette subsequently to complete its exposure, it includes control means that operates drive means to move the status indicator from the unexposed position to the partly exposed position in the event the filmstrip returned to the cassette shell is partly exposed and to move the status indicator from either the unexposed or partly exposed position to the exposed position in the event the filmstrip returned to the cassette shell is substantially exposed. However, the camera does not include any means that would prohibit receipt of the film cassette in the camera when the status indicator is in its exposed position.

Cross-referenced application Ser. No. 07/436,265 discloses a camera to be used with a film cassette which is inherently capable of automatically advancing a filmstrip from the cassette shell whether the filmstrip is generally unexposed, partly exposed or substantially exposed, and which has a status indicator for providing a visible indication of the exposure status of the filmstrip. In contrast to the camera disclosed in cross-referenced application Ser. No. 07/390,931, this one includes a sensing/blocking member which cooperates with the status indicator to prevent cassette loading into the camera in one embodiment only when the status indicator indicates that the filmstrip is substantially exposed and in another embodiment either when the status indicator indicates that the filmstrip is partly exposed or it indicates that the filmstrip is substantially exposed.

Cross-referenced application Ser. No. 07/492,038 discloses a camera to be used with a film cassette similar to the one shown in cross-referenced application Ser. No. 07/436,265. The camera is adapted to prevent exposure of the filmstrip when the status indicator indicates that the filmstrip is substantially exposed. Thus, in contrast to the camera disclosed in cross-referenced application Ser. No. 07/430,265, this one prevents re-exposure of exposed film in the camera as opposed to preventing cassette loading into the camera when the status indicator indicates that the filmstrip is substantially exposed.

SUMMARY OF THE INVENTION

According to the invention, there is provided a photographic camera to be used with a film cassette which can be operated to automatically thrust a filmstrip out of the cassette whether the filmstrip is generally unexposed or is substantially exposed and which has a film-exposure status indicator movable from an unexposed position for Providing a visible indication that the filmstrip is generally unexposed to an exposed position for providing a visible indication that the filmstrip is substantially exposed, wherein the camera is characterized in that:

film transport means is activatible for operating the film cassette to thrust the filmstrip out of the cassette;

indicator sensing means senses whether the status indicator of the cassette is in its exposed position for determining whether the filmstrip is substantially exposed; and control means connects the transport means and the indicator sensing means for preventing activation of the transport means when the status indicator is in its exposed position, whereby the filmstrip will not be thrust out of the cassette in this instance.

Thus, if a self-thrusting cassette is inadvertently loaded into the camera with its status indicator indicating the filmstrip stored in the cassette is substantially exposed, the camera cannot advance the filmstrip out of the cassette.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
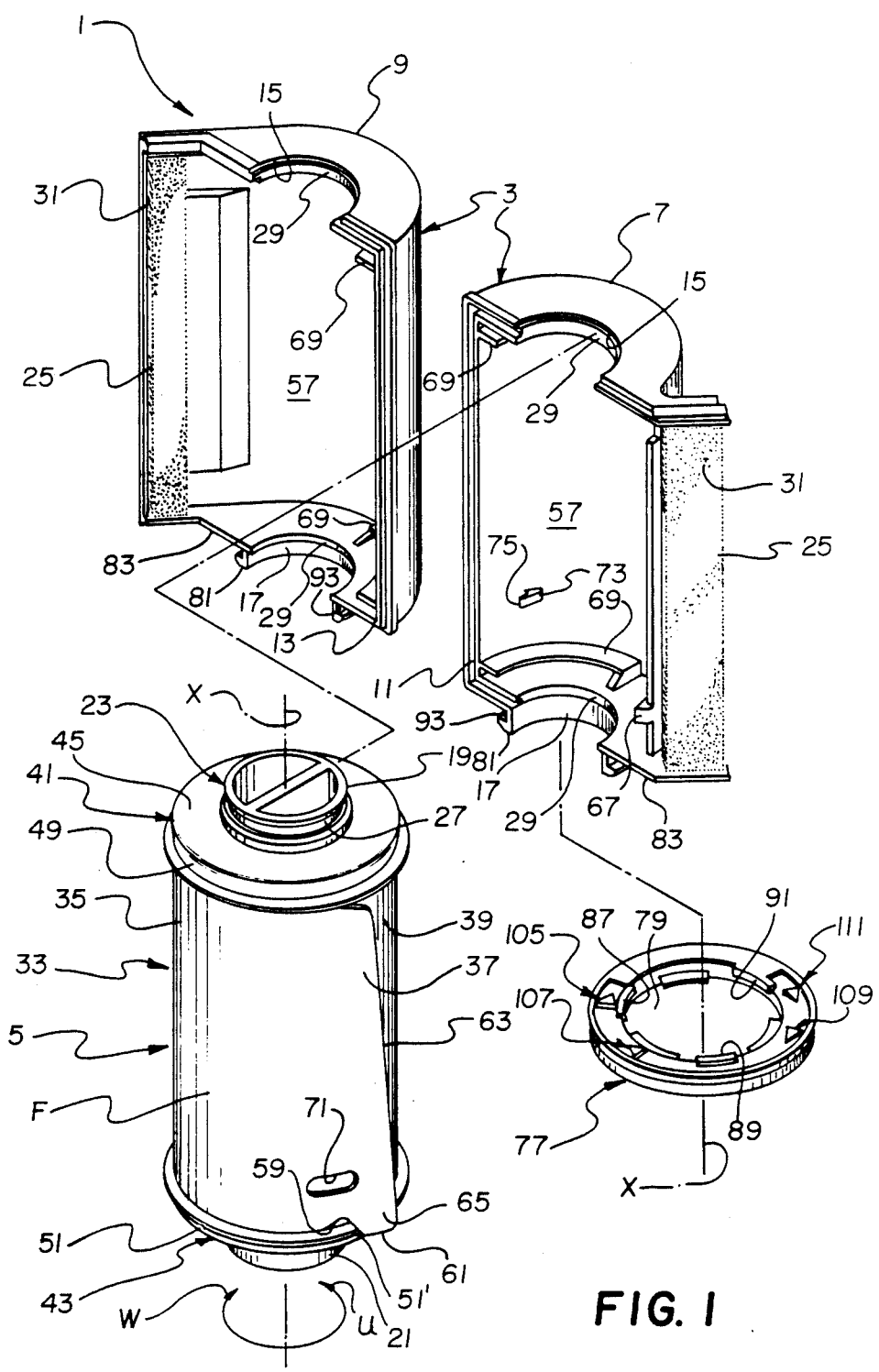
FIG. 1 is an exploded perspective view of a film cassette having a film-exposure status indicator as disclosed in the cross-referenced applications.
Figure 2:
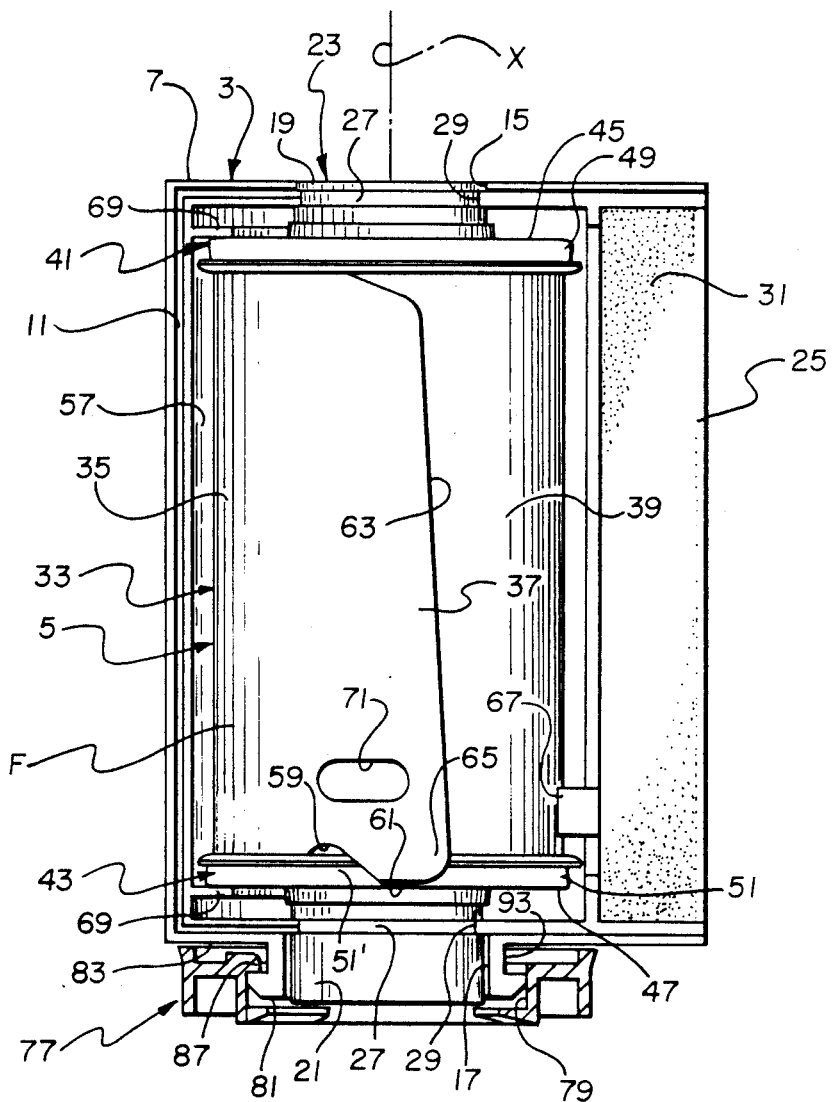
FIG. 2 is an elevation view of the film cassette, illustrating the cassette shell open to reveal a film roll coiled about a film spool.

Referring now to the drawings, FIGS. 1 and 2 depict a 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite end extensions 19 and 21 of a spool core or hub 23, and they define a film passageway 25 to the exterior of the cassette shell 3. The longer and shorter end extensions 19 and 21 of the spool core 23 each include an annular groove 27 which mates with a corresponding edge 29 of the respective openings 15 and 17 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
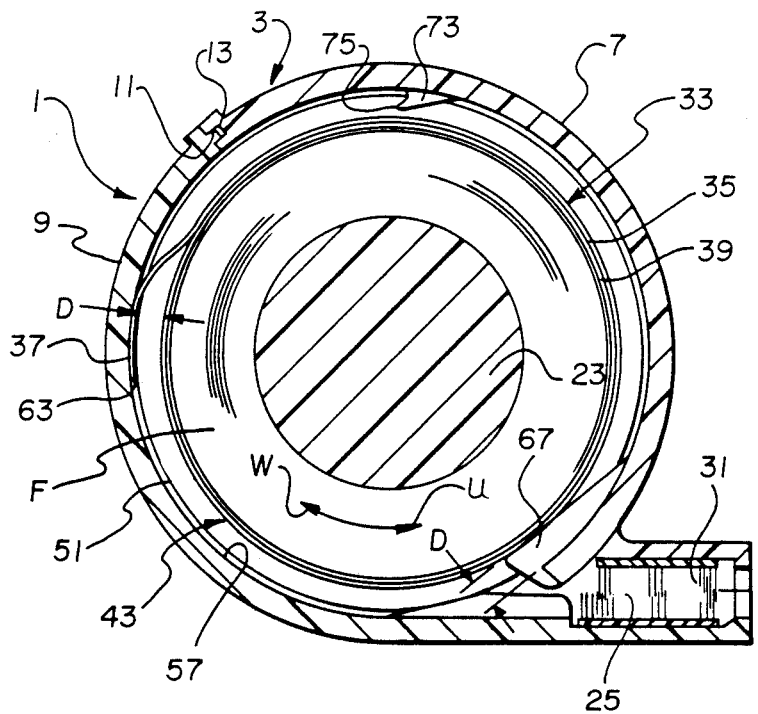
FIGS. 3 and 4 are end views in cross-section of the cassette shell, the film roll, and the film spool.

A roll 33 of 35 mm filmstrip F is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. The inner or trailing end of an innermost convolution, not shown, of the film roll 33 is secured to the spool core 23 by known means such as an adhesive tape.

Figure 5:
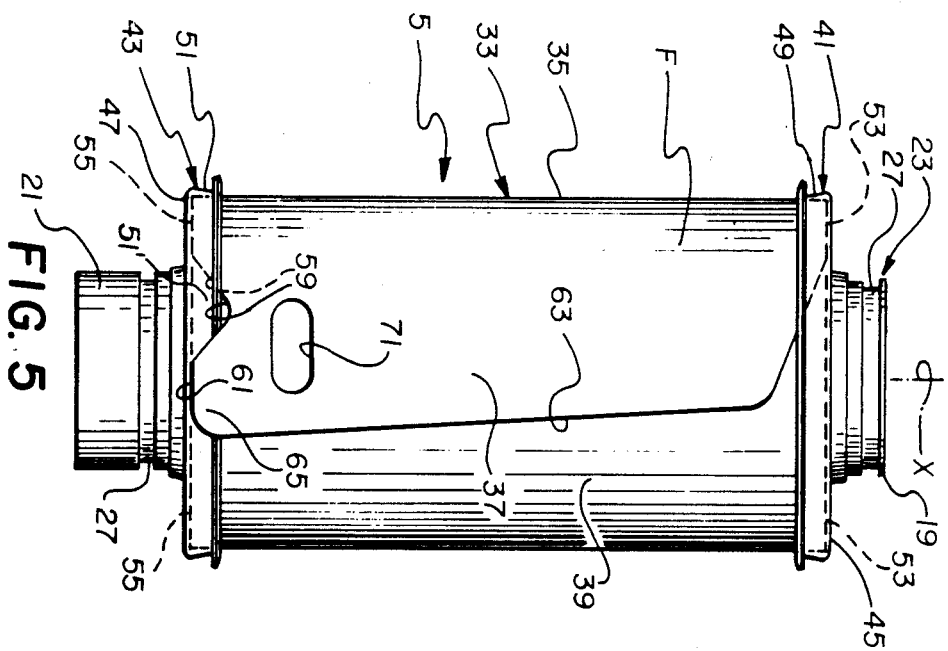
FIGS. 5 and 6 are elevation views of the film roll and the film spool, illustrating the manner in which the film roll is stored on the film spool.
Figure 6:
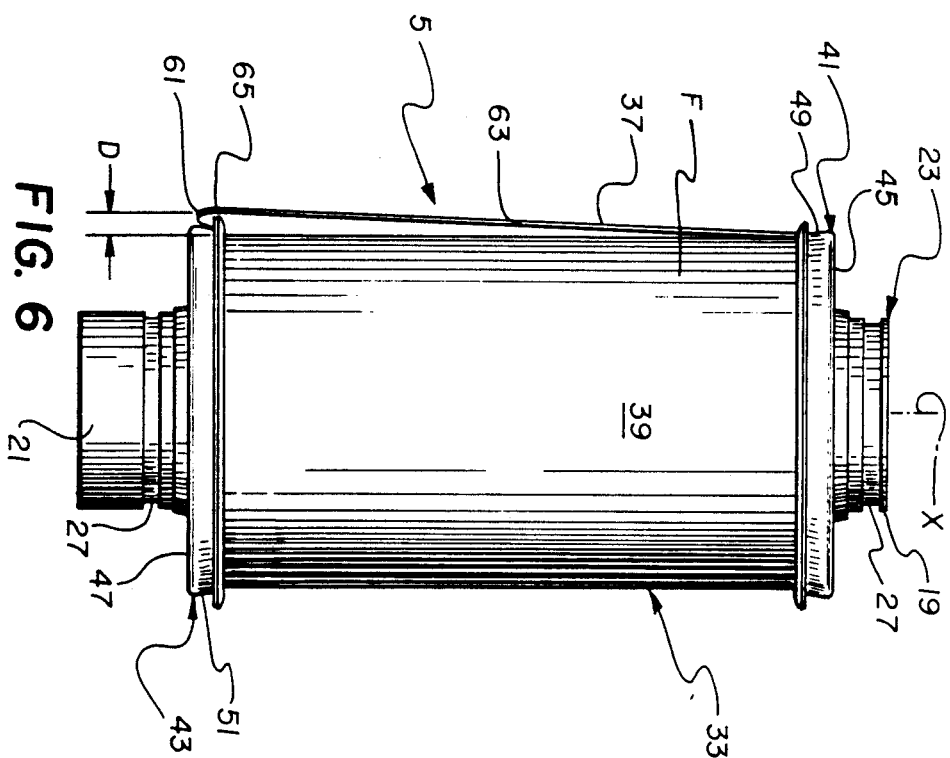
Figure 7:
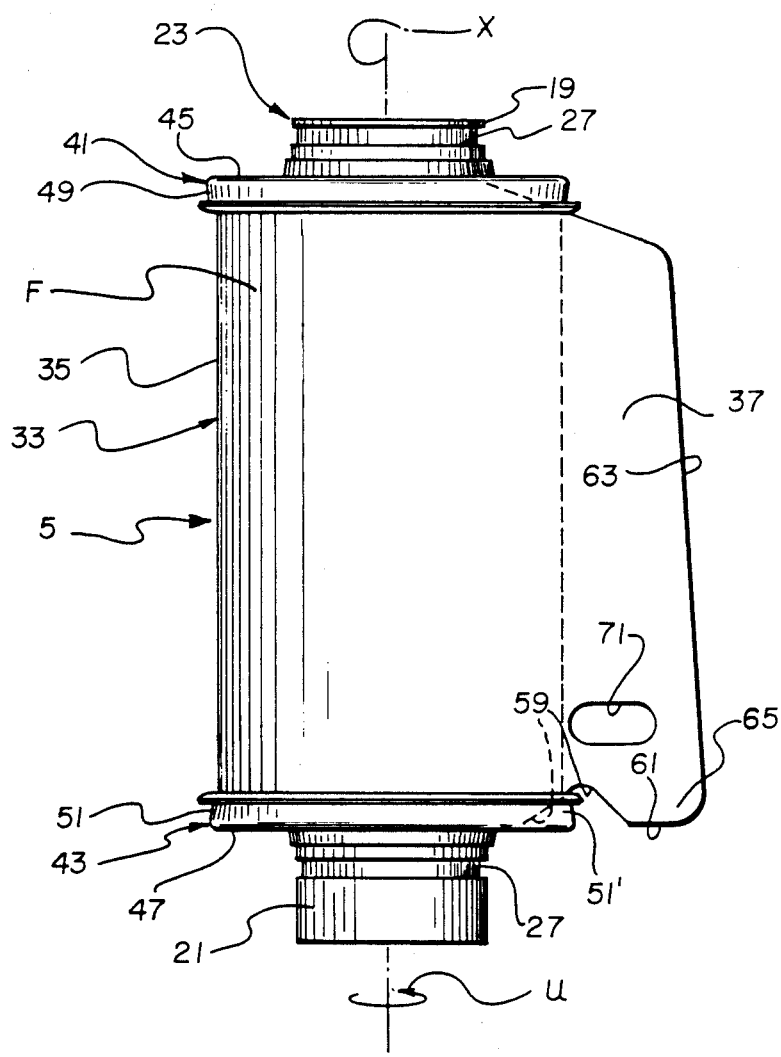
FIGS. 7 and 8 are elevation views similar to FIGS. 5 and 6, illustrating the manner in which the film roll is unwound from the film spool.

A pair of upper and lower identical, very thin, flexible film constraining flanges 41 and 43 are coaxially spaced along the spool core 23 as shown in FIGS. 1, 2, and 5. The two flanges 41 and 43 comprise respective integral disks 45 and 47 and respective integral annular lips or skirts 49 and 51 which circumferentially extend from the disks. The two disks 45 and 47 cover opposite flat sides, not shown, of the film roll 33 which are defined by corresponding opposite longitudinal edges 53 and 55 of each successive convolution of the film roll, and they have respective central holes, not shown, through which the spool core 23 axially extends to permit rotation of the spool core relative to the flanges 41 and 43. See FIG. 5. The annular lips 49 and 51 overlap the outermost convolution (film leader) 35 of the film roll 33 radially outwardly of the respective longitudinal edges 53 and 55 of that convolution to radially confine the convolution to thus prevent it from radially expanding or clock-springing into substantial contact with an interior curved wall 57 of the cassette shell 3. A lip-receiving notch 59 is cut in the outermost convolution (film leader) 35 along its longitudinal edge 55, relatively close to its leading end 37, to receive a peripheral section 51' of the annular lip 51. This allows a relatively short edge-section 61 of the outermost convolution (film leader) 35 connecting the leading end 37 and the notch 59 to overlap the annular lip 51 radially outwardly to thus maintain the leading end spaced a radial distance D from the next-inward convolution 39 of the film roll 33. See FIGS. 3 and 6. The leading end 37 has a forward edge 63 inclined from the longitudinal edge 53 of the outermost convolution 35 to the other longitudinal edge 55 of that convolution to form a forward-most tip or tab 65 of the convolution which, like the edge-section 61, overlaps the annular lip 51 radially outwardly. See FIG. 5.

A film stripper-guide 67 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the unwinding direction U. The leading end 37 will be advanced over the stripper-guide 67 and into the film passageway 25, rather than between the stripper-guide and the next-inward convolution 39, because it is spaced the radial distance D from the latter convolution. Thus, as shown in FIG. 3, the leading end 37 will be located within range of the stripper-guide 67 due to such spacing from the next-inward convolution 39.

Figure 8:
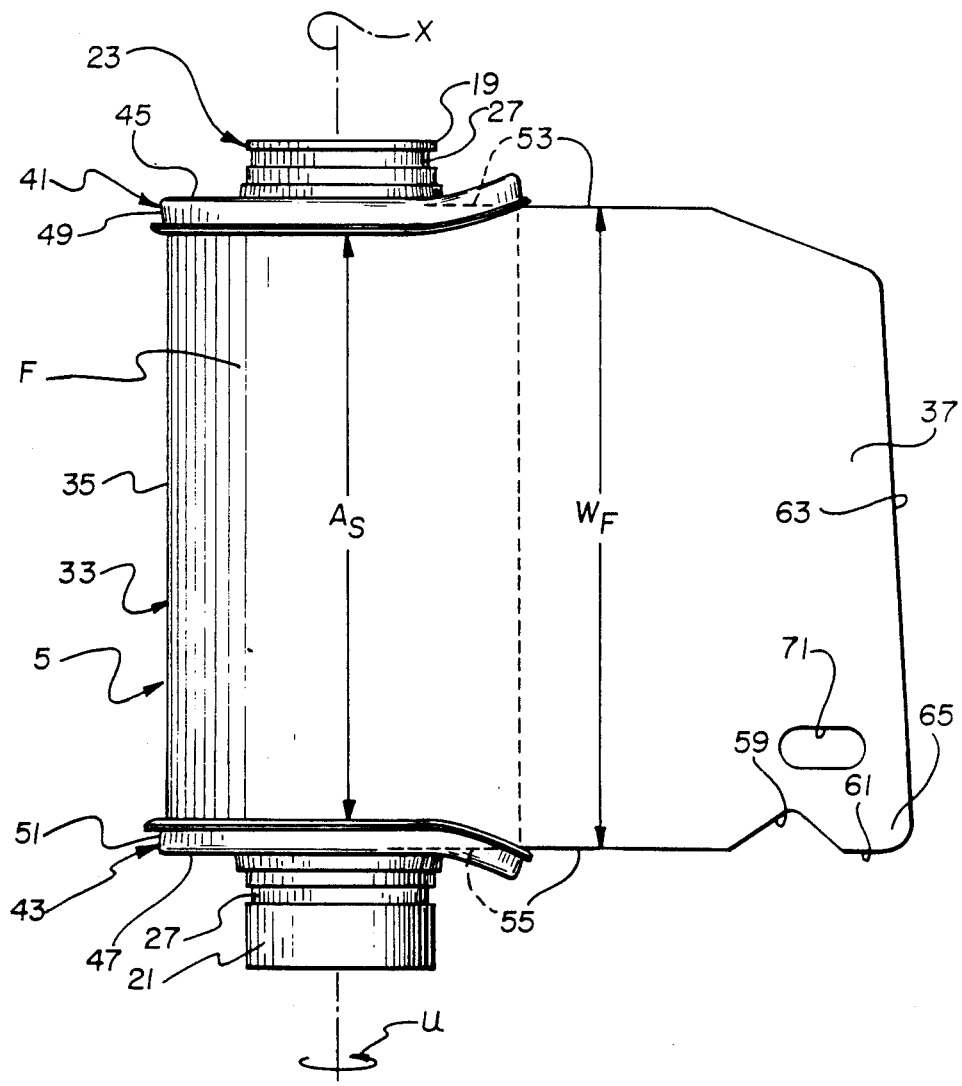

When the leading end 37 of the outermost convolution (film leader) 35 is advanced over the stripper-guide 67 responsive to rotation of the film spool 5 in the unwinding direction U, the longitudinal edges 53 and 55 of that convolution start to gently flex respective arcuate portions of the two flanges 41 and 43 axially away from one another as shown in FIG. 8, first to allow the notch 59 to separate from the lip section 51', and then to allow successive longitudinal sections of the film roll 33 (beginning with the leading end) to exit from between the flanges to the outside of the cassette shell 3. The local flexing of the flanges 41 and 43 occurs because the film width $W_F$ between the longitudinal edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be locally flexed. A pair of flat curved bearing members 69 extend from the interior wall 57 of the cassette shell 3 to lie flatly against successive arcuate portions of the two disks 45 and 47 as the flanges 41 and 43 are locally flexed axially away from one another, to thereby return the flexed portions of the flanges to their normal original non-flexed condition.

Figure 4:
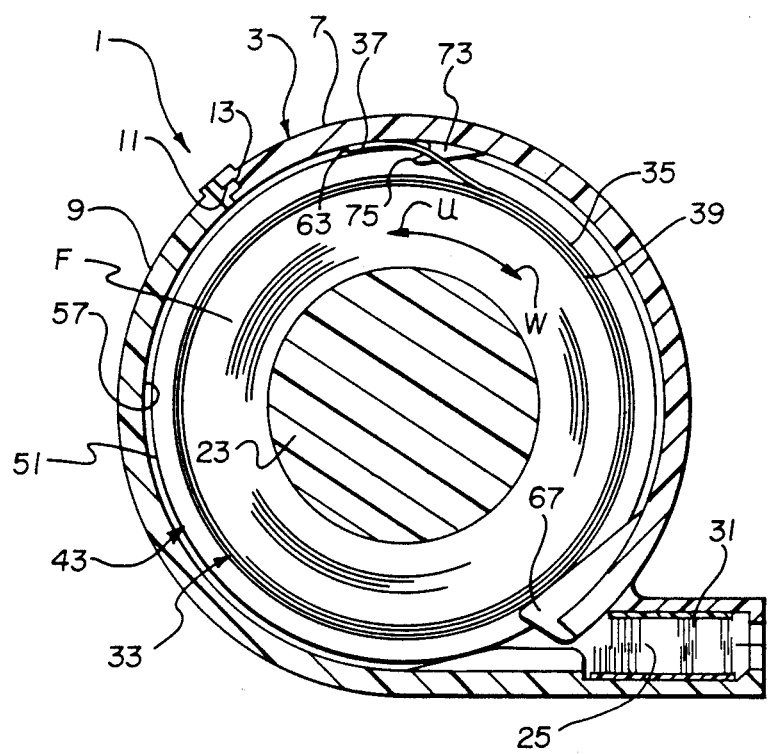

A slot 71 is cut in the outermost convolution (film leader) 35 substantially proximate its leading end 37. A tooth 73 fixed to the interior wall 57 of the cassette shell 3 has a free pointed end 75 which is positioned to be received in the slot 71 to thus engage the outermost convolution (film leader) 35, when the film spool 5 is rotated in the winding direction W as shown in FIG. 4, and to exit the slot to thus disengage that convolution, when the film spool is rotated in the unwinding direction U as shown in FIG. 3. The engagement of the outermost convolution 35 and the tooth 73 responsive to rotation of the film spool in the winding direction W prevents the leading end 37 of that convolution from coming to rest between the stripper-guide 67 and the next-inward convolution 39.

When the spool core 23 is initially rotated in the unwinding direction U, the two flanges 41 and 43 momentarily may remain stationary and the film roll 33, since its inner end is attached to the spool core, tends to expand radially or clock-spring to ensure a firm non-slipping relation between the outermost convolution (film leader) 35 of the film roll and the annular lips 49 and 51 of the flanges. Then, further rotation of the spool core 23 will similarly rotate the flanges 41 and 43. As a result, the leading end 37 of the outermost convolution (film leader) 35 will be advanced over the stripper-guide 67, causing successive arcuate portions of the flanges 41 and 43 to be flexed axially away from one another as shown in FIG. 8. This first allows the notch 59 to separate from the lip section 51', and then it allows successive longitudinal sections of the film roll 33 (beginning with the leading end 37) to exit from between the flanges to the outside of the cassette shell 3.

If the film spool 5 is rotated in the winding direction W before the entire length of the filmstrip F has been exposed, for example in a photographic camera, and it is desired to subsequently use the remaining available portion of the filmstrip at a later time, the film spool is rotated substantially until the slot 71 receives the free end 75 of the tooth 73 to thus engage the outermost convolution 35 (film leader) to the tooth. Thereafter, to use the remaining available portion of the filmstrip F, for example in a photographic camera, the film spool 5 is rotated in the unwinding direction U to disengage the outermost convolution (film leader) 35 from the tooth 73 and to re-advance the filmstrip to the outside of the cassette shell 3.

The Film-Exposure Status Indicator Of The Film Cassette

Figure 9:
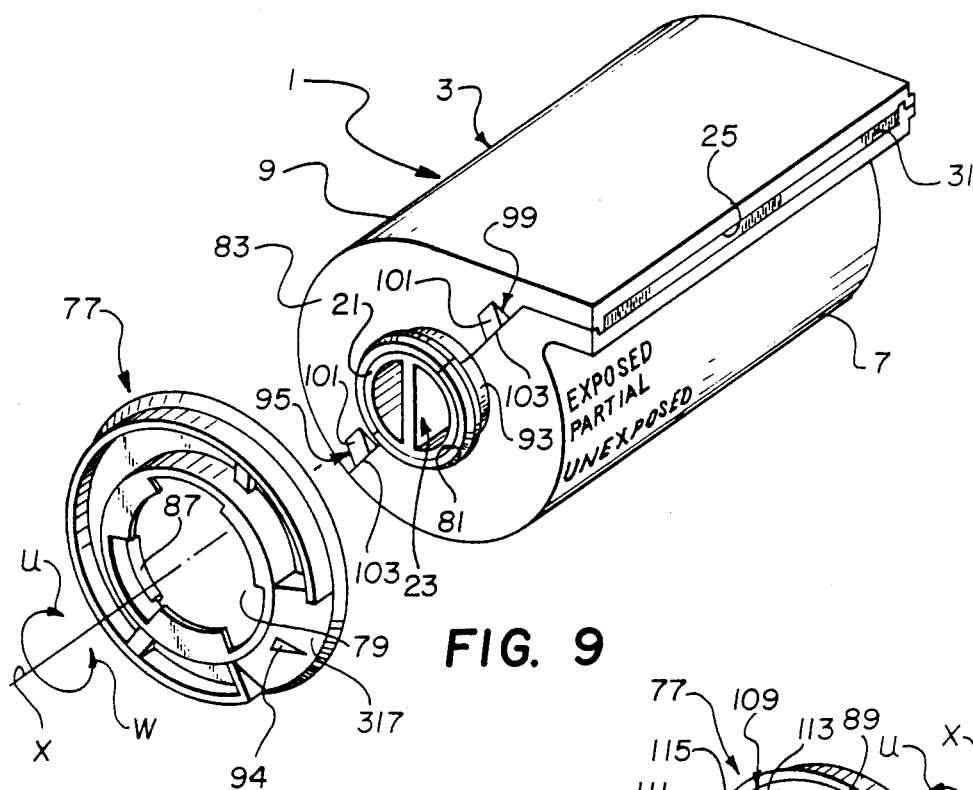
FIGS. 9 and 10 are exploded perspective views of the cassette shell and the film-exposure status indicator.
Figure 10:
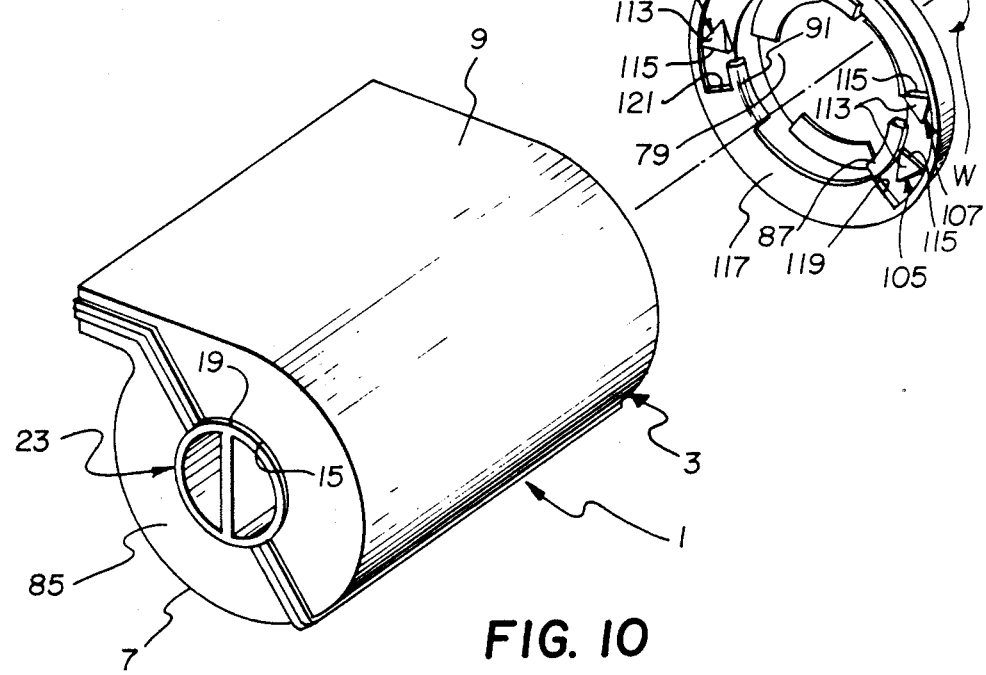

FIGS. 9 and 10 depict a ring-shaped film-exposure status indicator 77 having a central aperture 79 into which projects a neck-like extension 81 of one of two opposite exterior ends 83 and 85 of the cassette shell 3. The indicator 77 has three evenly spaced, radially inward tabs 87, 89, and 91 that fit into a peripheral annular groove 3 in the neck-like extension 81 to support the indicator for rotation about the axis X relative to the cassette shell 3 and the film spool 5.

Figure 11A:
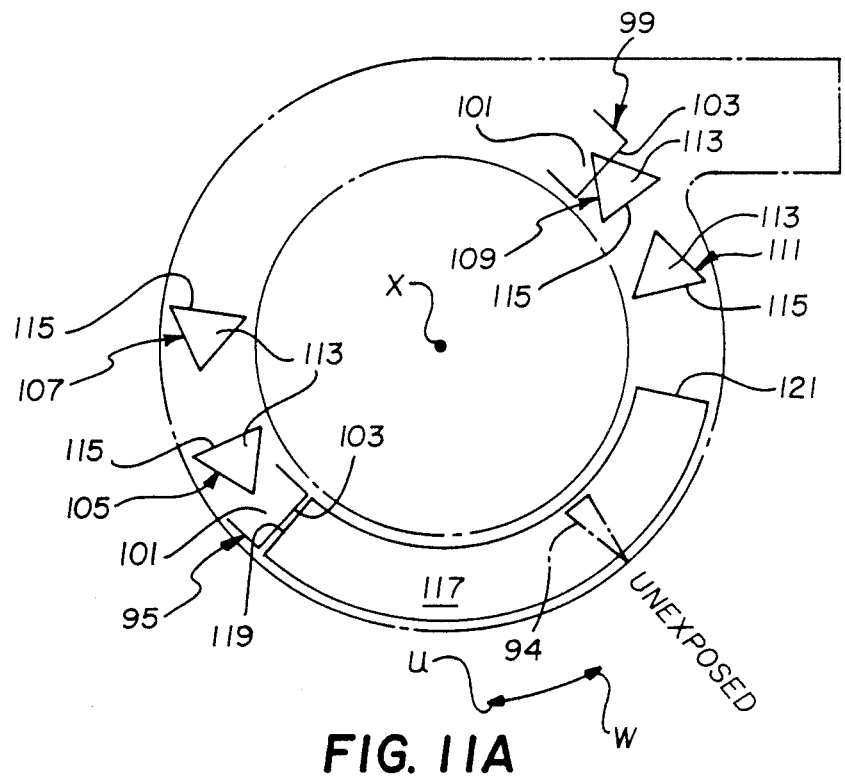
FIGS. 11A and 11B are schematic views depicting the status indicator in a normal first or unexposed position to indicate the film roll is generally unexposed.
Figure 12A:
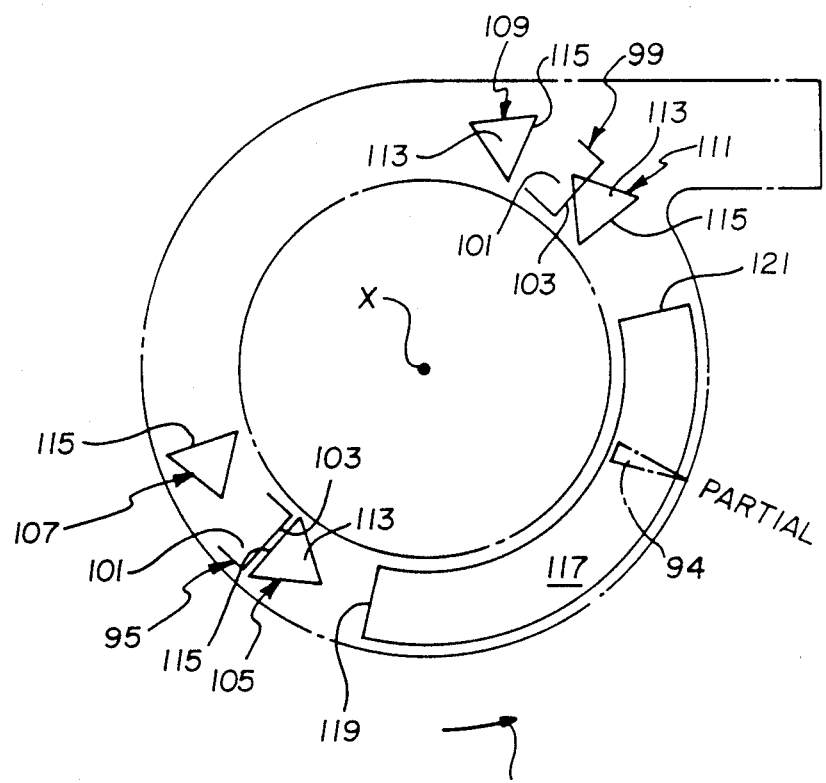
FIGS. 12A and 12B are schematic views depicting the status indicator in a second or partly exposed position to indicate the film roll is only partly exposed.
Figure 13A:
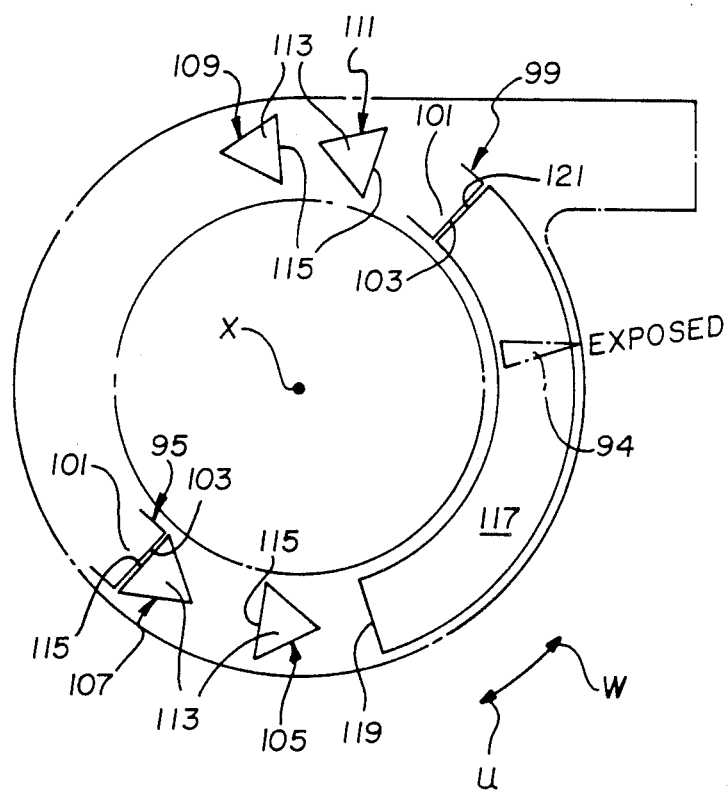
FIGS. 13A and 13B are schematic views depicting the status indicator in a third or exposed position to indicate the film roll is substantially exposed.
Figure 15:
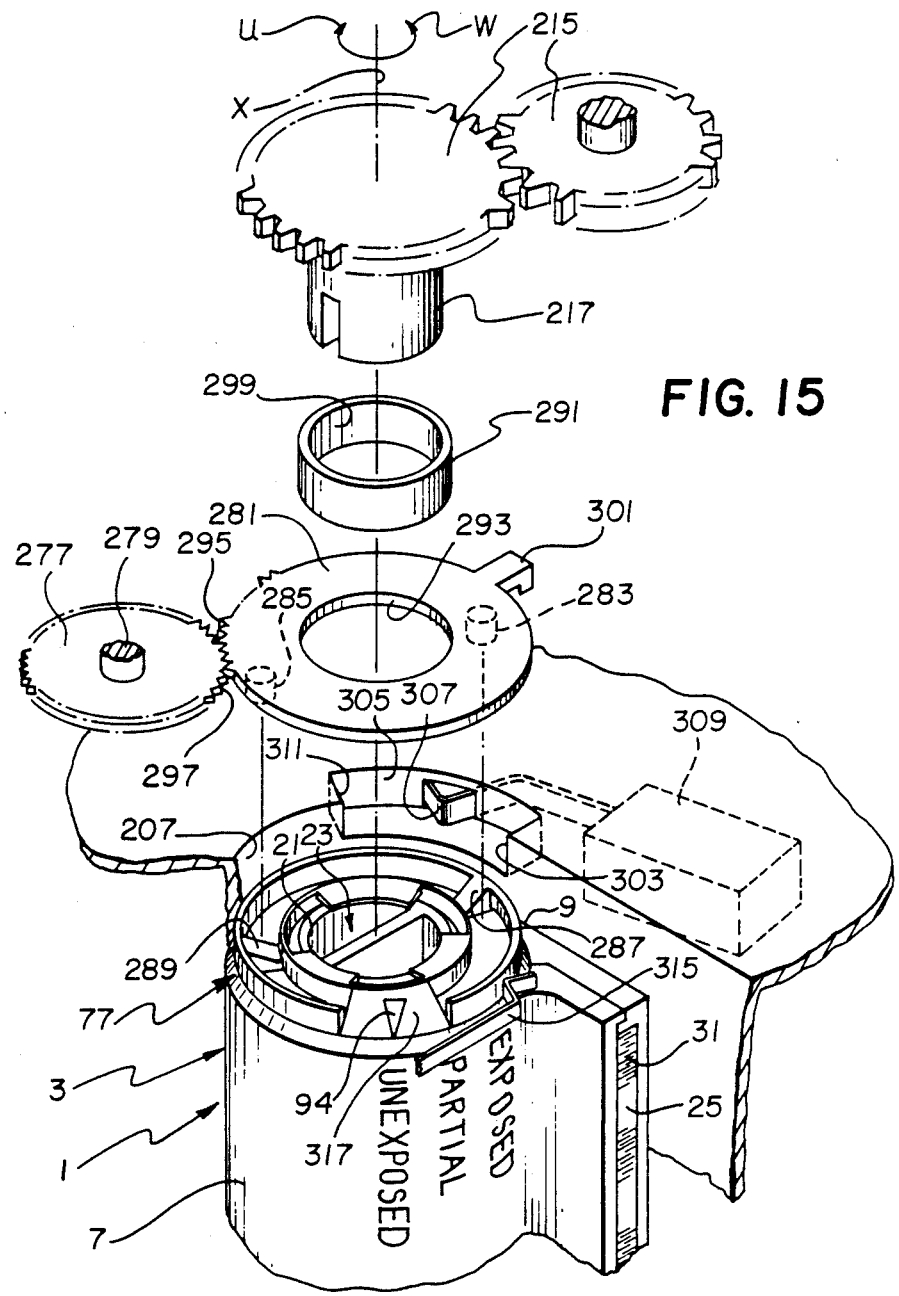
FIG. 15 is an exploded perspective view of drive means of the camera apparatus for moving the status indicator of the film cassette to its three positions.

The indicator 77 is intended to be rotated, for example in the winding direction W, from an original or normal first position, shown in FIGS. 11A and 15, to successive second and third positions, shown in FIGS. 12A and 13A, for providing respective visible indications that the filmstrip F stored in the cassette shell 3 is generally unexposed, the filmstrip has been returned to the inside of the shell before all of the film frames have been exposed, and the filmstrip is substantially exposed. To achieve these visible indications, a pointer 94 is formed on the indicator 77 for individual alignment with each of three successive imprints "UNEXPOSED", "PARTIAL", and "EXPOSED" printed on the outside of the cassette shell 3. See FIG. 9. When the indicator 77 is in its first or unexposed position, shown in FIGS. 11A and 15, the pointer 94 points to the imprint "UNEXPOSED". When the indicator 77 is in its second or partly exposed position, shown in FIG. 12A, the pointer 94 points to the imprint "PARTIAL". When the indicator 77 is in its third or exposed position, shown in FIG. 13A, the pointer 94 points to the imprint "EXPOSED".

Figure 11B:
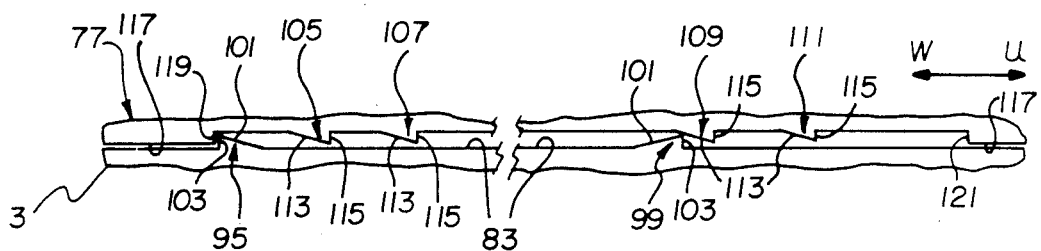
Figure 12B:
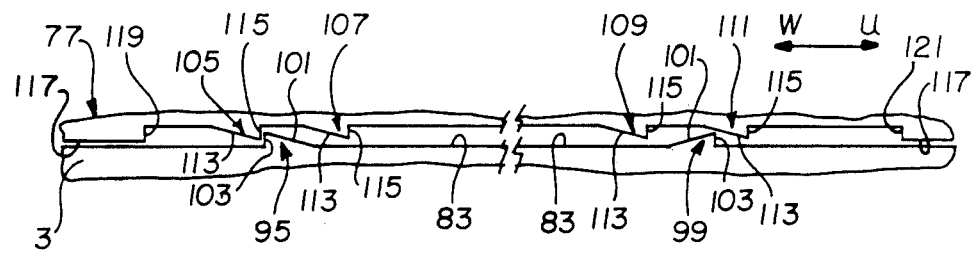
Figure 13B:
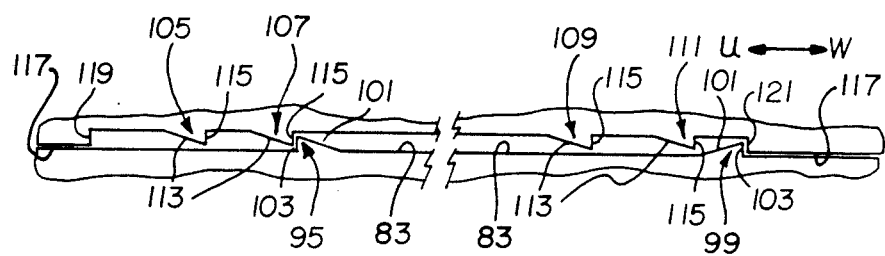

Cooperative engagement means are formed on the exterior end 83 of the cassette shell 3 and the underside of the indicator 77 for limiting rotation of the indicator unidirectionally in the winding direction W from its first or unexposed position to its second or partly exposed position and from the second position to its third or exposed position, and for preventing rotation of the indicator out of the third position. Specifically, the engagement means formed on the exterior end 83 of the cassette shell 3 comprises a pair of identical ramps 95 and 99, each having an inclined surface 101 and a cliff surface 103, and being radially in-line and equally spaced from the axis X. See FIGS. 9, 11A, and 11B. The engagement means formed on the underside of the indicator 77 comprises four identical ramps 105, 107, 109, and 111, each having an inclined surface 113 and a cliff surface 115, and each being equally spaced from the axis X, and a single flat 117 having two identical cliff surfaces 119 and 121 similarly spaced from the axis X. See FIGS. 10, 11A and 11B. When the indicator is in its first or unexposed position, shown in FIGS. 11A and 11B, the cliff surface 103 of the ramp 95 is located adjacent the cliff surface 119 of the flat 117, to absolutely prevent rotation of the indicator in the unwinding direction U, and the cliff surface 103 of the ramp 99 is located opposite the inclined surface 113 of the ramp 109, to lightly restrain the indicator from being rotated in the winding direction W. Thus, the indicator 77 is secured in the first or unexposed position, but can be moved to the second or partly exposed position. If the indicator 77 is then rotated in the winding direction W, the inclined surface 113 of the ramp 109 will move over the cliff surface 103 of the ramp 99. When the indicator 77 is in its second or partly exposed position, shown in FIGS. 12A and 12B, the cliff surface 103 of the ramp 95 is located adjacent the cliff surface 115 of the ramp 105, to absolutely prevent rotation of the indicator in the unwinding direction U, and the cliff surface 103 of the ramp 99 is located opposite the inclined surface 113 of the ramp 111, to lightly restrain the indicator from being rotated in the winding direction W. Thus, the indicator 77 is secured in the second or partly exposed position, but can be moved to the third or exposed position. If the indicator 77 is then rotated in the winding direction W, the inclined surface 113 of the ramp 111 will move over the cliff surface 103 of the ramp 99. When the indicator 77 is in its third or exposed position, shown in FIGS. 13A and 13B, the cliff surface 103 of the ramp 95 is located adjacent the cliff surface 115 of the ramp 107, to absolutely prevent rotation of the indicator in the unwinding direction U, and the cliff surface 103 of the ramp 99 is located adjacent the cliff surface 121 of the flat 117, to absolutely prevent rotation of the indicator in the winding direction. Thus, the indicator 77 cannot be moved out of the third or exposed position.

The Photographic Camera

Figure 14:
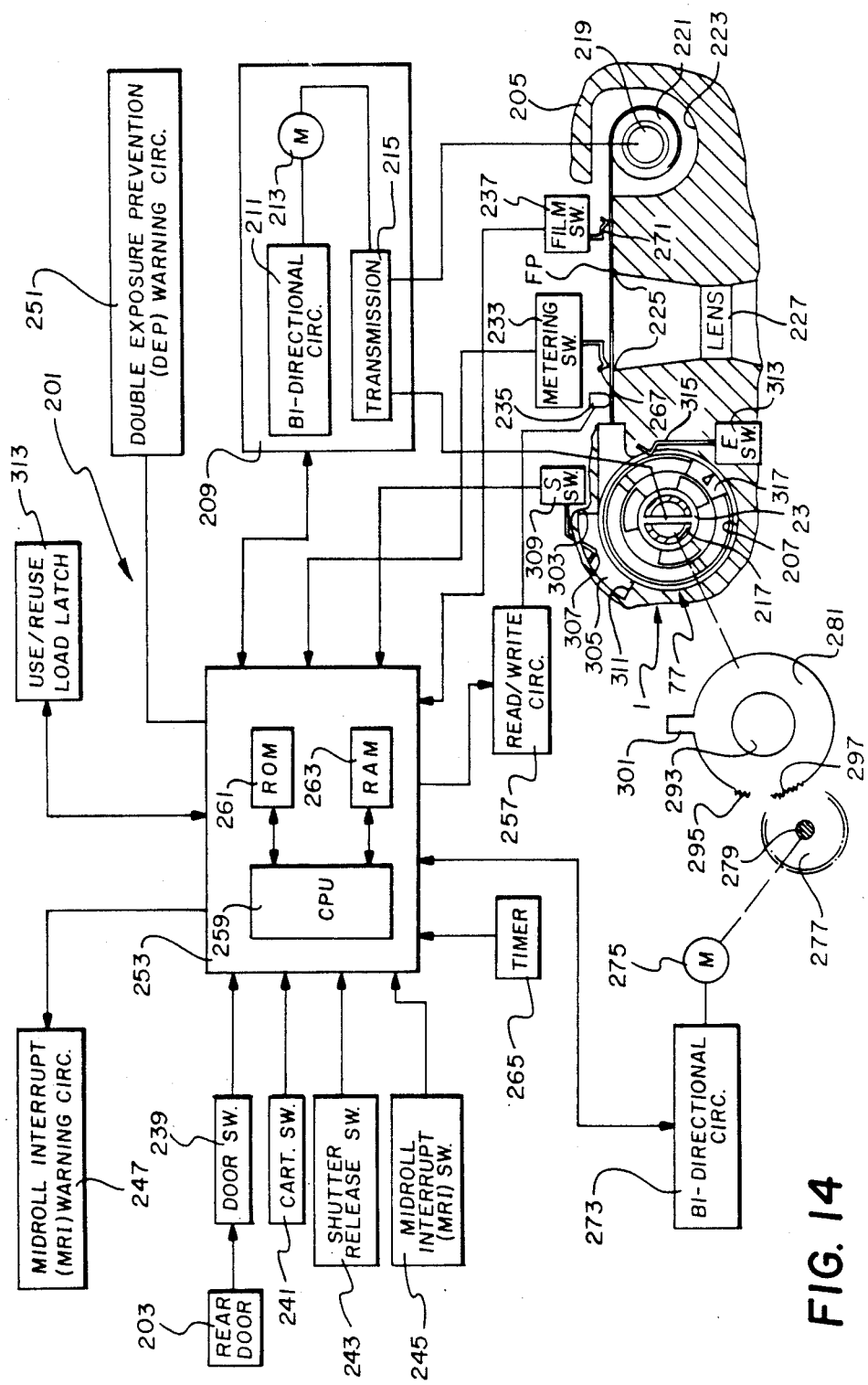
FIG. 14 is a schematic view of camera apParatus for use with the film cassette, according to a preferred embodiment of the invention.

Referring now to FIG. 14, camera apparatus 201 is depicted for use with the film cassette 1 having the film-exposure status indicator 77. Briefly, the camera apparatus 201 is intended to magnetically apply successive double exposure prevention (DEP) encodements to the filmstrip F to indicate respective film frames are exposed, and to read the last DEP encodement to prevent re-exposure of the exposed frames when a partly exposed film roll is loaded in the camera apparatus. Moreover, the camera apparatus 201 is intended to move the status indicator 77 from its normal first or unexposed position to its successive second or partly exposed and third or exposed positions, and to determine when the indicator is in the third position to visibly (or audibly) alert the user in certain circumstances.

As shown in FIG. 14, the camera apparatus 201 includes a rear or bottom door 203 pivotally mounted on the camera body 205 for opening to permit insertion of the film cassette 1 laterally or axially (endwise) into a loading chamber 207. Conventional motorized film transport means 209 comprises a bi-directional circuit 211, a reversible drive motor 213 controlled by the circuit, a suitable drive transmission 215, and respective drive hubs 217 and 219. The drive hubs 217 and 219 engage the spool core 23 of the film cassette 1 and a take-uP spool or drum 221 rotatably supported within a take-up chamber 223, to rotate the spool core and the take-up drum either in the unwinding direction U or in the winding direction W.

Figure 17:
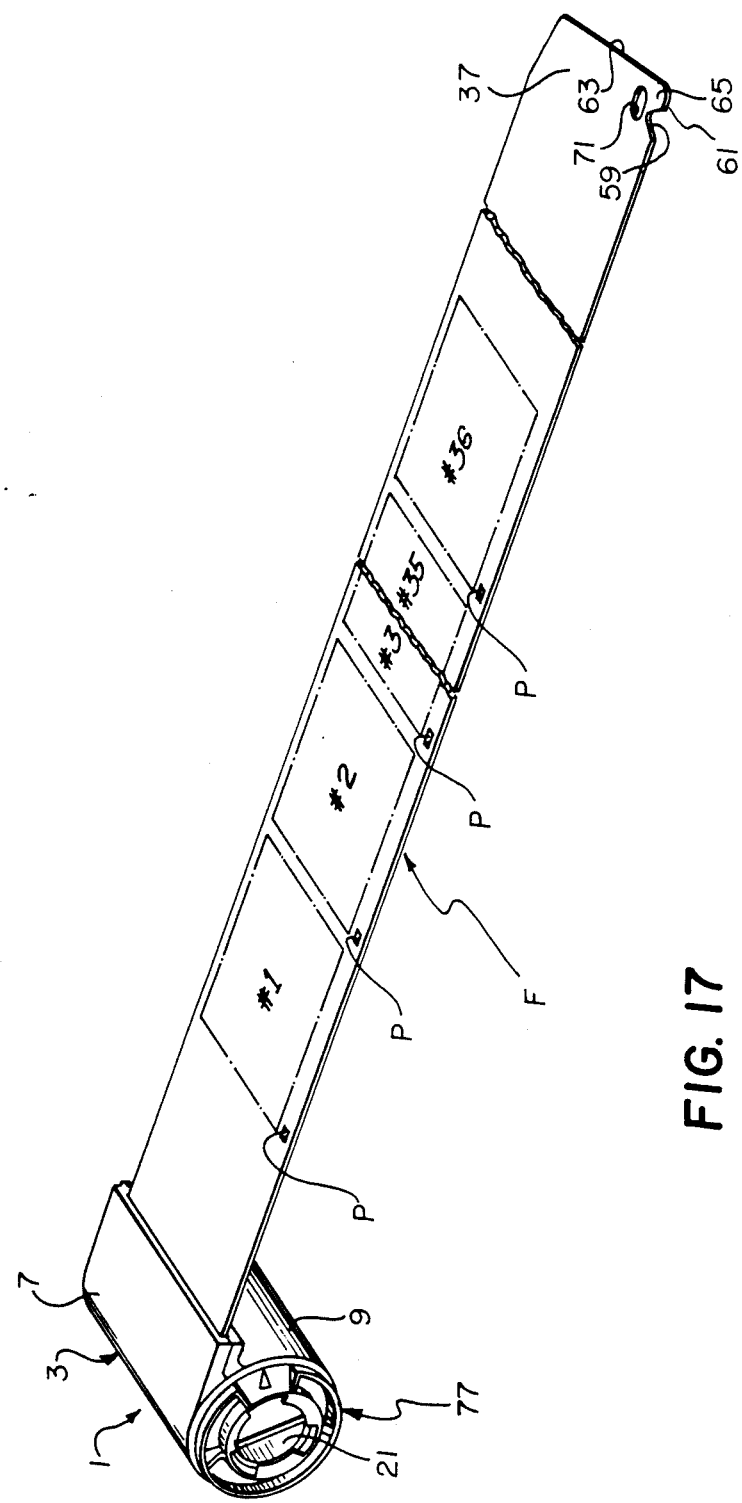
FIG. 17 is a perspective view of the film cassette shown with substantially the entire length of the filmstrip extending from the cassette shell.

When fresh, unused, unexposed film is loaded in the camera apparatus 201, the film transport means 209 is operated in a prewind mode initially to rotate the spool core 23 of the film cassette 1 in the unwinding direction U to propel the non-protruding leading end 37 of the filmstrip F out of the cassette shell 3, across a back frame opening 225 situated at the focal plane FP of a taking (objective) lens 227, and onto the take-up drum 221. At the same time, the drum 221 is rotated in the same direction U to permit a tooth, not shown, located on its periphery, to engage the slot 71 cut in the filmstrip F proximate its leading end 37. Following this, substantially the entire remainder of the filmstrip F is prewound without interruption from the cassette shell 3 across the back frame opening 225 and onto the drum 221. The film movement occurs without exposing the filmstrip F. Since the trailing end, not shown, of the filmstrip F is secured to the spool core 23, an end-of-film condition will be reached which causes the motor 213 to stall, whereupon as is customary the bi-directional circuit 211 reverses the motor to operate the film transport means 209 in a rewind mode, opposite to the prewind mode. During the rewind mode, the spool core 23 is rotated in the winding direction W and the drum 221 is rotated similarly. However, the film transport means 209 is de-energized once a first-available film frame #1 in FIG. 17 is moved to an exposure position at the back frame opening 225. Then, after the first picture is taken, the film transport means 209 is operated in the rewind mode to wind the first exposed frame onto the spool core 23 and to move the next-available unexposed frame #2 in FIG. 17 to the exposure position. This process is repeated following each film exposure, and the filmstrip F will thereby be rewound one exposed frame at a time into the cassette shell 3. Thus, the exposed frames will be protected inside the cassette shell 3 if, for example, the rear door 203 is accidentally opened before the filmstrip F is completely returned to the film cassette 1.

Other elements of the camera apparatus 201 include a normally closed metering switch 233, a conventional magnetic read/write head 235, a normally open film sensing switch 237, a normally open door switch 239, a normally open cartridge switch 241, a normally open shutter release switch 243, a normally open midroll interrupt (MRI) switch 245, and respective conventional midroll interrupt (MRI) and double exposure prevention (DEP) visual-warning circuits 247 and 251. Each of the elements 233, 235, 237, 239, 241, 243, 245, 247, and 251, as well as the film transport means 209, is connected individually to a conventional digital microcomputer 253 such as used in many recent cameras. As shown in FIG. 14, the read/write head 235 is connected to the microcomputer 253 via a conventional read/write circuit 257. The microcomputer 253 as is customary includes a central processing unit (CPU) 259, a random access memory (RAM) 261, a read-only memory (ROM) 263, and an external timer 265.

Figure 18:
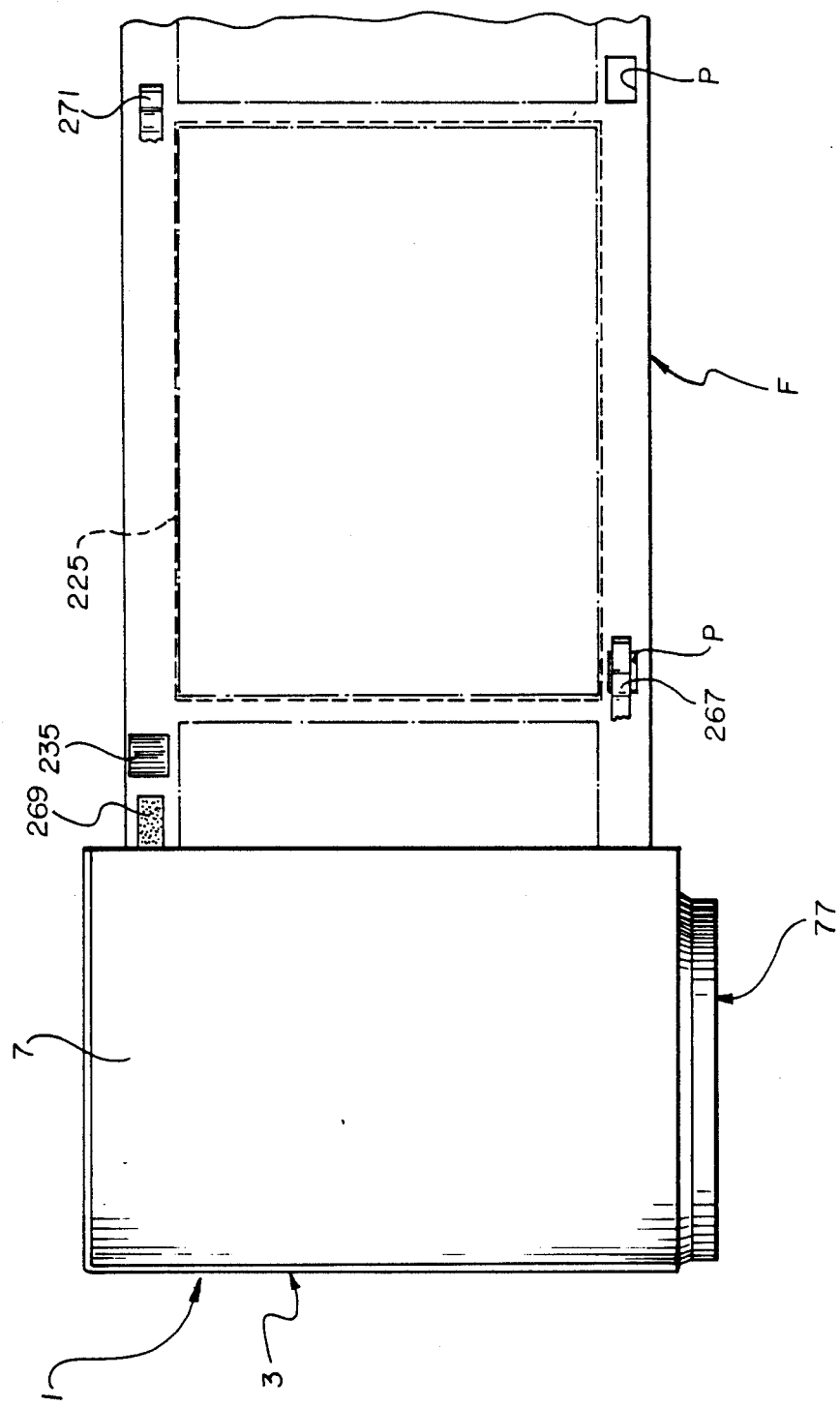
FIG. 18 is a plan view of the film cassette and the filmstrip.

The metering switch 233 is closed each time a perforation sensor 267 of the switch drops into one of a series of evenly spaced film perforations P in the filmstrip F. As shown in FIG. 17, the filmstrip F has a single perforation P between each two adjacent film frames #1-#36. No perforations P, however, exist between the film frame #36 and the leading end 37 of the filmstrip F. When the metering switch 233 is closed it indicates the filmstrip F has been moved slightly more than a single frame width. As shown in FIG. 18, the perforation sensor 267 is located adjacent one corner of the back frame opening 225. Thus, closure of the metering switch 233 will occur whenever one of the film frames #1-#36 is in the exposure position at the back frame opening 225.

The read/write head 235 is adapted to magnetically write identical double exposure prevention (DEP) encodements 269, one of which is shown in FIG. 18, along the filmstrip F adjacent each exposed film frame to indicate a film frame is exposed, and it is adapted to magnetically sense the presence or absence of a DEP encodement for a film frame to determine whether that particular frame is exposed. The DEP encodement 269 is written on the filmstrip F every time an exposed film frame is moved from its exposure position at the back frame opening 225 and into the film cassette 1 (during the rewind mode of the film transport means 209), and conversely it would be read whenever an exposed film frame is advanced from the film cassette (during the prewind mode of the film transport means). As shown in FIGS. 14 and 18, the read/write head 235 is located between the loading chamber 207 for the film cassette 1 and the back frame opening 225. The filmstrip F may be provided with a known magnetic stripe or a known transparent magnetic overlay, not shown, on which each DEP encodement 269 is to be written. A suitable support, not shown, for the read/write head 235 may be located on the rear door 203.

The door switch 239 is closed when the rear door 203 is closed and is opened when the rear door is opened. The cartridge switch 241 is closed whenever the film cassette 1 is present in the loading chamber 207 and is open whenever the chamber is empty. The shutter release switch 243 is closed each time a trigger or release button, not shown, on the camera body 205 is manually depressed to initiate opening of a known camera shutter, not shown, and is open whenever the camera shutter is closed. The midroll interrupt (MRI) switch 245 is closed when an MRI button, not shown, on the camera body 205 is manually depressed to initiate rewind of the filmstrip F into the film cassette 1 prematurely, i.e. before all of the available film frames have been exposed. The film sensing switch 237 is closed when a film sensor 271 of the switch contacts the filmstrip F and is opened whenever the film sensor is out of contact with the filmstrip. As shown in FIGS. 14 and 18, the film sensing switch 237 is located between the back frame opening 225 and the take-up drum 221.

Other elements of the camera apparatus 201 are provided for moving the status indicator 77 of the film cassette 1 from its normal first or unexposed position to its successive second or partly exposed and third or exposed positions. These elements are shown in FIGS. 14 and 15, and include a bi-directional circuit 273 connected to the microcomputer 253, a reversible drive motor 275 controlled by the circuit, a drive gear 277 coaxially fixed to the motor shaft 279, and a drive ring 281 having two pins 283 and 285 on its underside for engaging respective fixtures 287 and 289 of the status indicator 77 to rotate the indicator in the winding direction W from its first or unexposed position to its successive second or partly exposed and third or exposed positions. The drive ring 281 is supported for rotation in the winding and unwinding directions W and U about a bearing ring 291 located within a central opening 293 in the drive ring, and has peripheral teeth 295 in mesh with corresponding teeth 297 of the drive gear 277. As shown in FIG. 15, the drive hub 217 for rotating the spool core 23 of the film cassette 1 in the unwinding and winding directions U and W extends through a central opening 299 in the bearing ring 291. Thus, the drive ring 281 and the drive hub 217 are disposed coaxially.

Figure 16A:
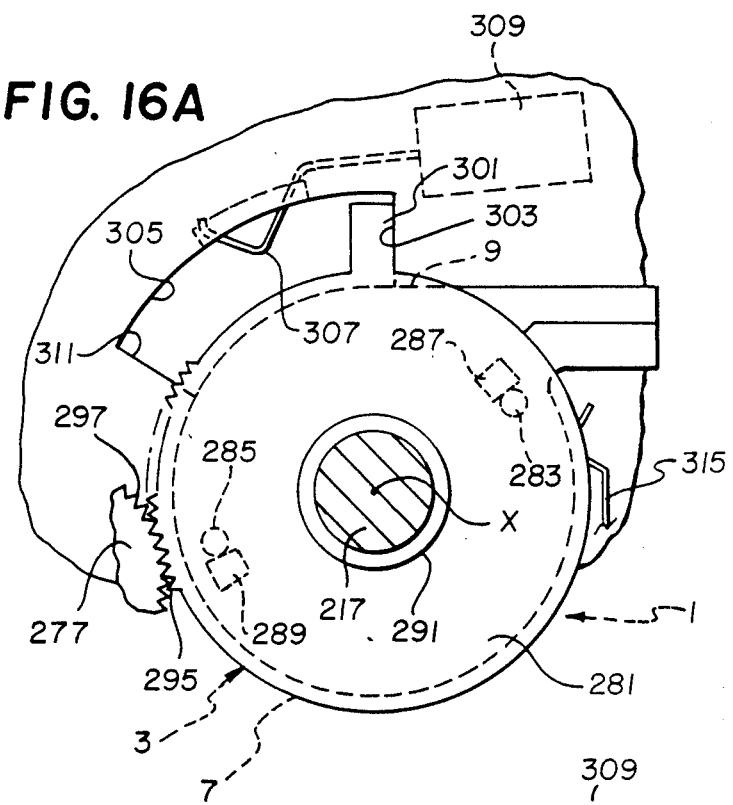
FIGS. 16A, 16B, and 16C are schematic views depicting orientation of the drive means when the status indicator is in its respective positions.
Figure 16B:
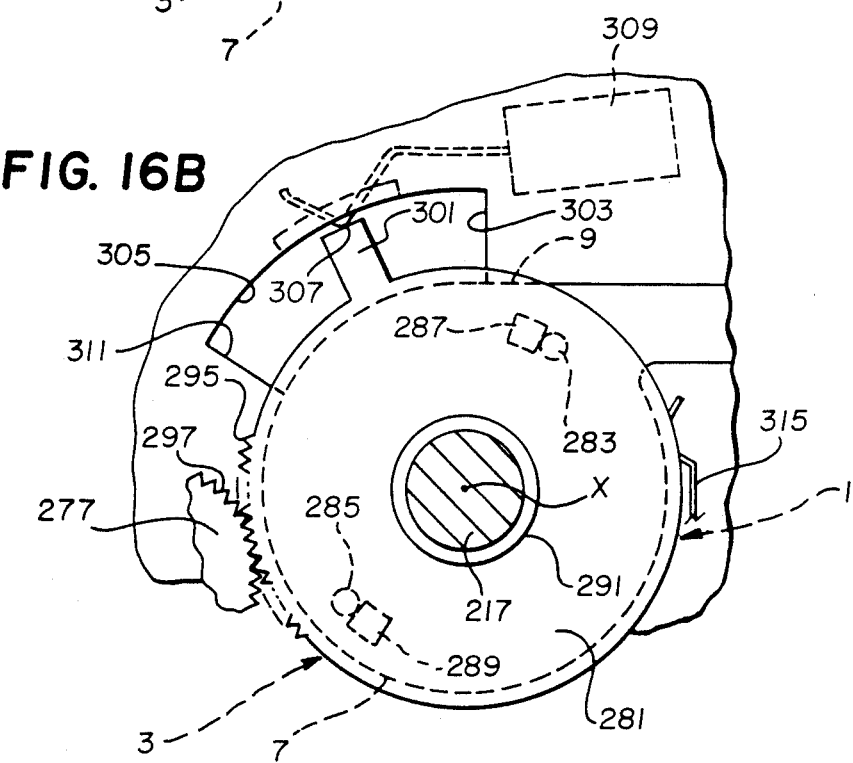
Figure 16C:
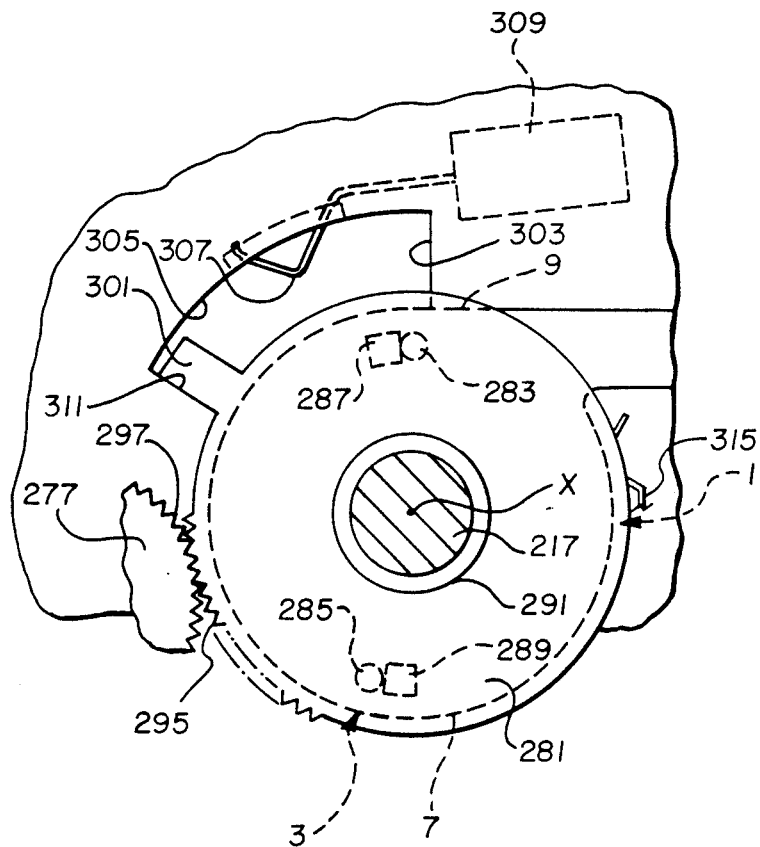

When the status indicator 77 is in its normal first or unexposed position as shown in FIGS. 11A, 15, and 16A, the drive ring 281 is oriented with its respective pins 283 and 285 abutting the fixtures 287 and 289 of the indicator and with an integral finger 301 abutting a stop wall 303 of a recess 305 in the loading chamber 207. Abutment of the finger 301 and the stop wall 303 prevents rotation of the drive ring 281 in the unwinding direction U. If the drive ring 281 is rotated in the winding direction W to similarly rotate the indicator 77 from its first or unexposed position to its second or partly exposed position as shown in FIGS. 12A and 16B, the drive ring will be oriented with its respective pins 283 and 285 continuing to abut the fixtures 287 and 289 and with its integral finger 301 depressing a switching member 307 of a normally open S (status) switch 309 to close the switch. The S switch 309 is connected to the microcomputer 253. If the drive ring 281 is rotated in the winding direction W to similarly rotate the indicator 77 from either its first or unexposed position or its second or partly exposed position to its third or exposed position as shown in FIGS. 13A and 16C, the drive ring will be oriented with its respective pins 283 and 285 continuing to abut the fixtures 287 and 289 and with its integral finger 301 abutting a stop wall 311 of the recess 305. Abutment of the finger 301 and the stop wall 311 prevents further rotation of the drive ring 281 in the winding direction W. If the drive ring 281 is rotated in the unwinding direction U and the indicator 77 is in either its second or partly exposed position or its third or exposed position, the indicator must remain in place because of the engagement means (previously described) on the exterior end 83 of the cassette shell 3 and the underside of the indicator for limiting rotation of the indicator to the winding direction W from its first or unexposed position to its second and third positions.

A normally closed E (exposed) switch 313 connected to the microcomputer 253 is arranged with a switching member 315 to be depressed by the status indicator 77 to open the switch, when the indicator 77 is in its normal first or unexposed position or its second or partly exposed position. See FIGS. 14 and 15. Conversely, when the indicator 77 is in its third or exposed position, the switching member 315 falls into a discontinuity or void 317 along the indicator to close the E switch 313. Thus, the E switch 313 is used to determine whether the indicator 77 is or is not in its third or exposed position.

Flow Charts FIGS. 19A and 19B, 20A-20C, 21A and 21B

FIGS. 19A and 19B, 20A-20C, and 21A and 21B are respective flow charts which depict three explicit routines or modes of the microcomputer 253 that are effected in cooperation with the various switches 233, 237, 239, 241, 243, 245, 309 and 313, with the film transport means 209, with the read/write head 235, with the midroll interrupt (MRI) and double-exposure prevention (DEP) warning circuits 247 and 251, with the bidirectional circuit 273, and with a known use/reuse load latch 319. The load latch 319 changes state, for example by changing from a normal "NO" or binary "0" configuration to a "YES" or binary "1" configuration whenever a film cassette containing unexposed or partly exposed film is placed in the loading chamber 207 and the first-available film frame is exposed. Thereafter, the load latch 319 remains in the "YES" confirmation as the successive film frames are exposed.

Figure 19A:
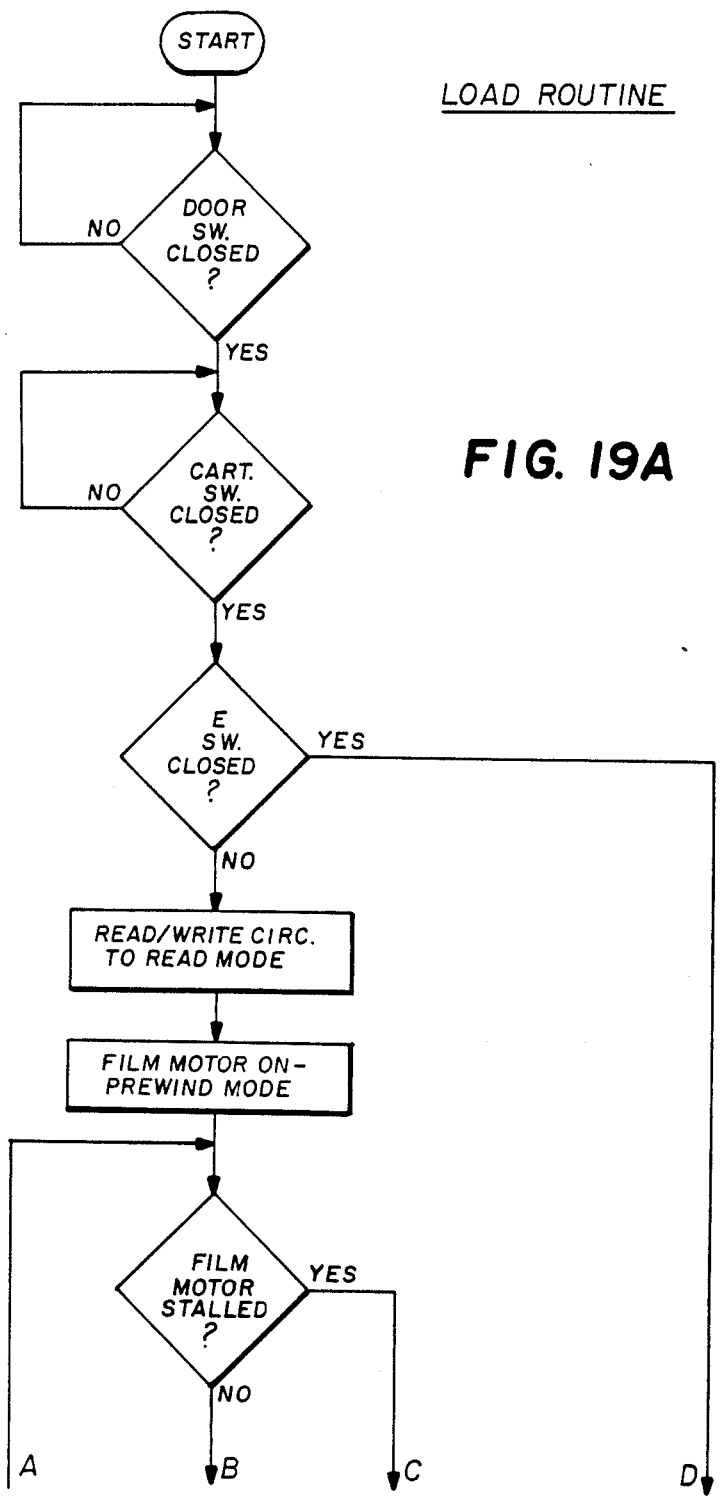
FIGS. 19A and 19B are a flow chart illustrating a load routine of the camera apparatus.
Figure 19B:
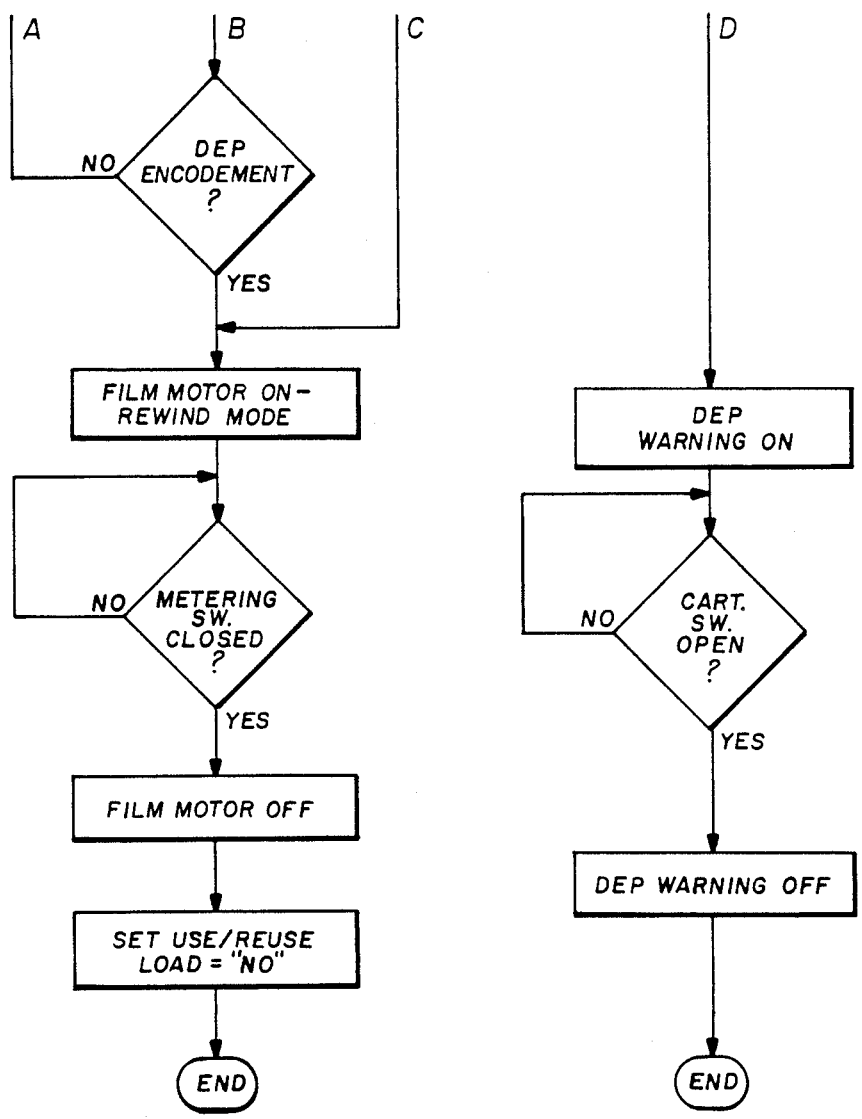

(1) Load Routine—FIGS. 19A and 19B

If in this routine the door switch 239 is closed because the rear door 203 is closed, the cartridge switch 241 is closed because the film cassette 1 is loaded in the loading chamber 207, and the E switch 313 is open because the status indicator 77 is in its normal first or unexposed position or its second or partly exposed position, i.e. the filmstrip F is generally unexposed or only partially exposed, the read/write circuit 257 will assume the read mode to enable the magnetic head 235 to determine the presence or absence of a DEP encodement 269 on the filmstrip, and the film transport means 209 will be operated in the prewind mode to energize the motor 213 to rotate the spool core 23 of the film cassette in the unwinding direction U and to rotate the take-up drum 221 in the same direction in order to advance the filmstrip F continuously from the cassette shell 3 onto the take-up drum without exposing any of the film frames. If the filmstrip F is generally unexposed, i.e. it is fresh unused film, substantially the entire length of the filmstrip will be wound onto the take-up drum 221 and the resulting end-of-film condition will stall the motor 213, thereby causing the film transport means 209 to be operated in the rewind mode instead of the prewind mode. Consequently, the motor 213 will be reversed to rotate the spool core 23 in the winding direction W and to rotate the take-up drum 221 in the same direction until the metering switch 233 is closed. Then, the motor 213 will be de-energized. At this time, the first-available unexposed frame #1 in FIG. 17 will be in the exposure position at the back frame opening 225. Concurrently, the use/reuse load latch 319 will be set to "NO", thereby indicating that no exposure has been made following the present film load. If the filmstrip F is partially exposed because it was removed from the camera apparatus 201 before all of the available film frames #1-#36 in FIG. 17 were exposed, and now it has been re-loaded into the camera apparatus, the read/write head 235 will read the first DEP encodement 269 that emerges from the film cassette 1. Then, the film transport means 209 will be changed from its prewind mode to its rewind mode and the motor 213 will be reversed to return the last-exposed film frame to the film cassette. See FIG. 18. When the metering switch 233 is closed because the next-available unexposed frame has been moved to the exposure position at the back frame opening 225, the motor, 213 will be de-energized and the load latch 319 will be set to "NO" to indicate that no exposure has been made following the present film load.

When in this routine the E switch 313 is closed because the status indicator 77 is in its third or exposed position, i.e. the filmstrip F is substantially exposed, the film transport means 209 will not be operated. Instead, the filmstrip F will remain in the cassette shell 3, and the DEP warning circuit 251 will be activated to remind the user the film strip is completely exposed. This alerts the user to remove the film cassette 1 from the loading chamber 207, whereupon the DEP warning circuit 251 will be deactivated.

Figure 20A:
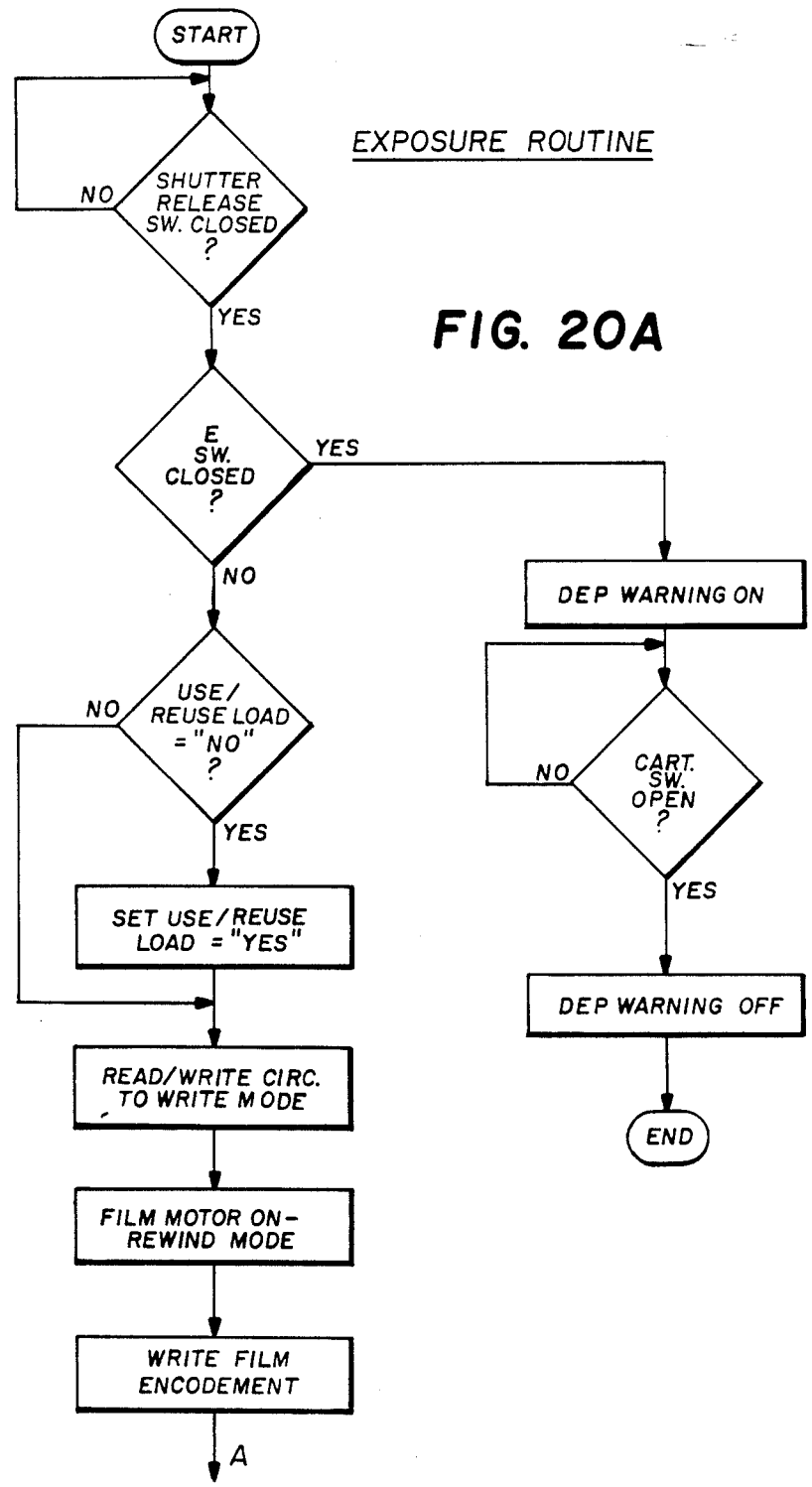
FIGS. 20A, 20B, and 20C are a flow chart illustrating an exposure routine of the camera apparatus.
Figure 20B:
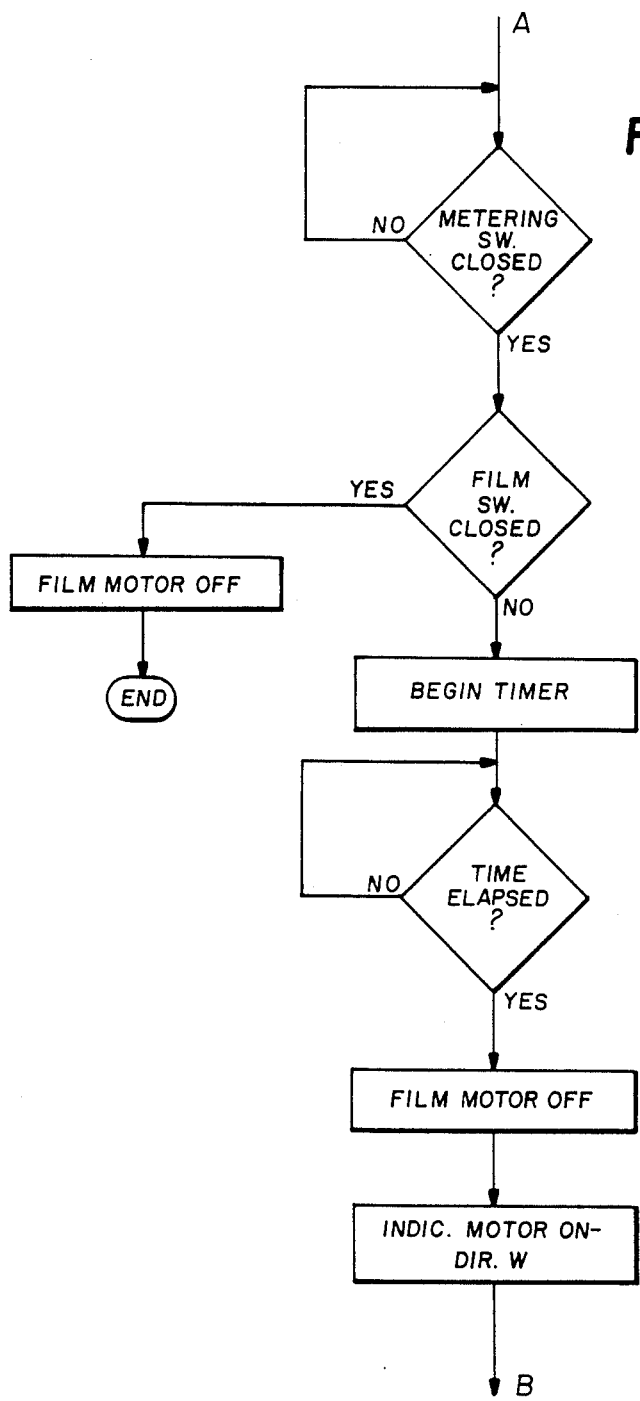
Figure 20C:
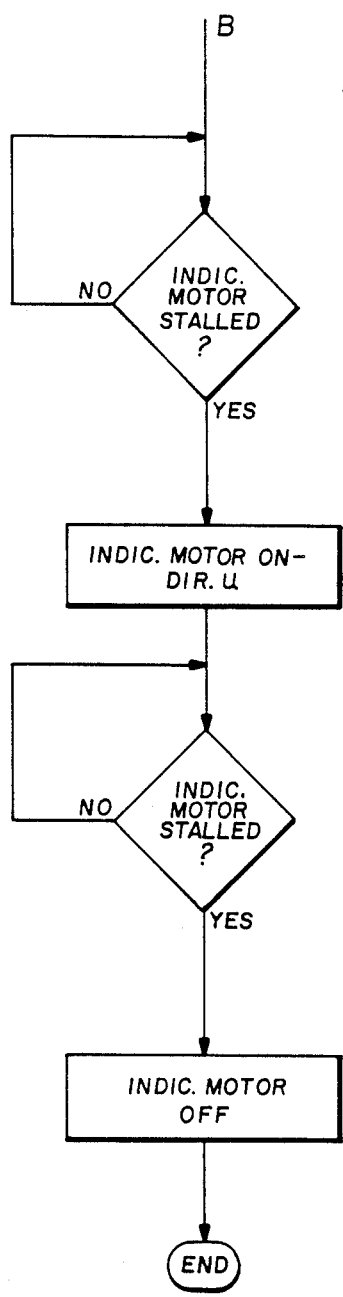

(2) Exposure Routine—FIGS. 20A, 20B, and 20C

If in this routine the shutter release switch 243 is closed to open the camera shutter, and the E switch 313 is open because the status indicator 77 is in its normal first or unexposed position or its second or partly exposed position, i.e. the filmstrip F is generally unexposed or only partially exposed, the load latch 319 will be set to "YES" if not already in that configuration (because at least one exposure was previously made following the present film load), the read/write circuit 257 will assume the write mode, and the film transport means 209 will be operated in its rewind mode to energize the motor 213 to rewind the exposed frame into the film cassette 1 and to move the next-available unexposed frame to the exposure position at the back frame opening 225. As the exposed frame is moved out of the exposure position, the read/write head 235 will write a DEP encodement 269 on the filmstrip F at a predetermined location adjacent the exposed frame to indicate that particular frame is exposed. When the metering switch 233 is closed because the next-available unexposed frame has been moved to the exposure position, and the film presence sensing switch 237 is closed due to the presence of the filmstrip at the film sensor 271 of that switch, the motor 213 will be de-energized. If the film presence sensing switch 237 is open because the leading end 37 of the filmstrip F was rewound past the film sensor 271 of that switch (in which instance the metering switch 233 will close when the leading end is rewound past the perforation sensor 267 of that switch), the timer 265 will be activated. When the timer 265 determines that a sufficient time has elapsed to rewind the leading end 37 of the filmstrip F into the film cassette 1, the motor 213 will be de-energized and the motor 275 will be energized to rotate the drive ring 281 in the winding direction to in turn rotate the status indicator 77 from either its first or unexposed position or its second or partly exposed position to its third or exposed position. When the motor 275 is first stalled because the integral finger 301 of the drive ring 281 abuts the stop wall 311 of the recess 305, the motor will be reversed via the bi-directional circuit 273 to rotate the drive ring in the unwinding direction U, leaving the indicator 77 in its third or exposed position. When the motor 275 is again stalled because the integral finger 301 of the drive ring 281 abuts the stop wall 303 of the recess 305, the motor will be de-energized.

When in this routine the E switch 313 is closed because the status indicator 77 is in its third or exposed position, i.e. the filmstrip F is substantially exposed, the DEP warning circuit 251 will be activated to alert the user the filmstrip is completely exposed. This informs the user to remove the film cassette 1 from loading chamber 207, whereupon the DEP warning circuit 251 will be deactivated.

Figure 21A:
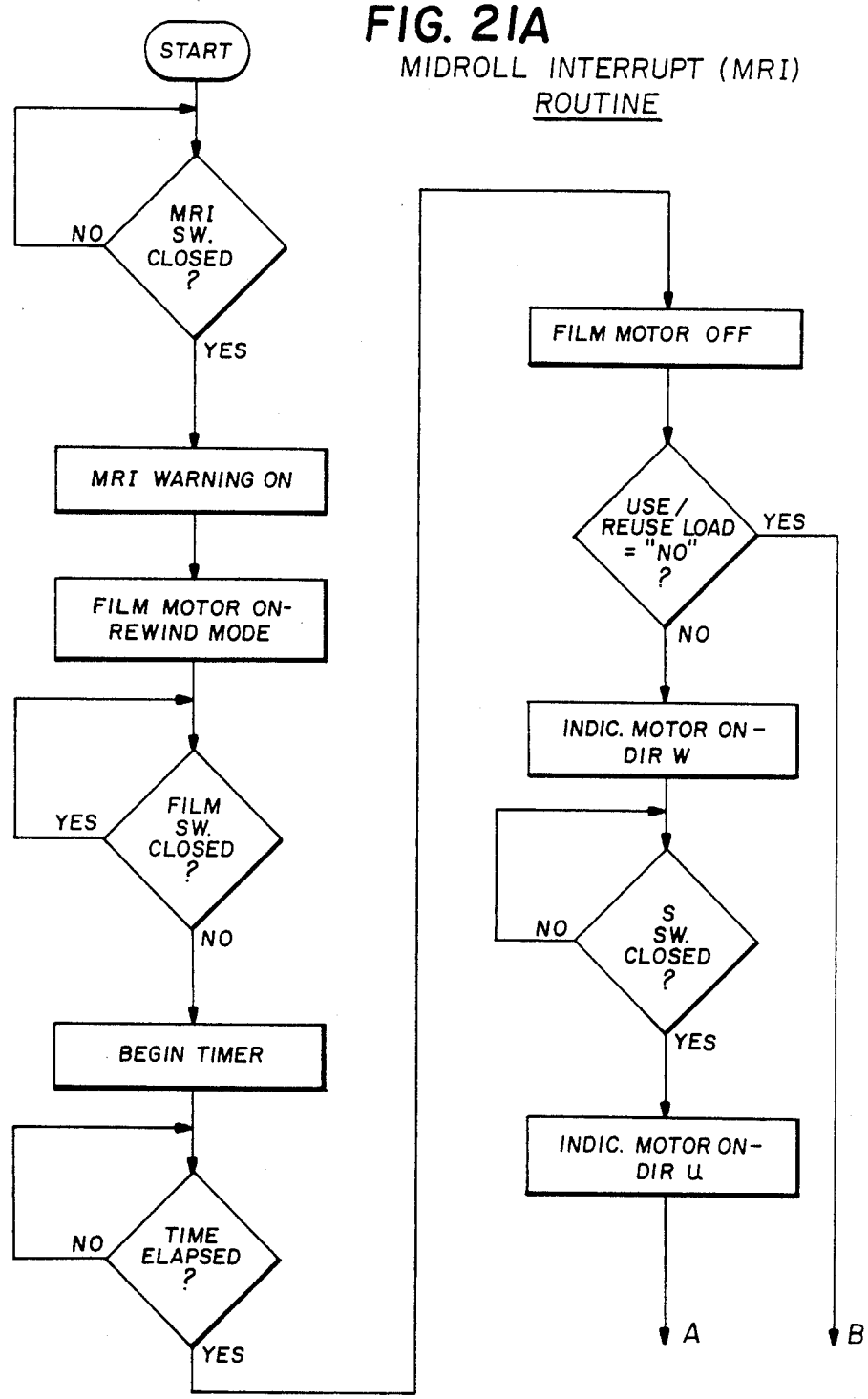
FIGS. 21A and 21B are a flow chart illustrating a midroll interrupt (MRI) routine of the camera apparatus.
Figure 21B:
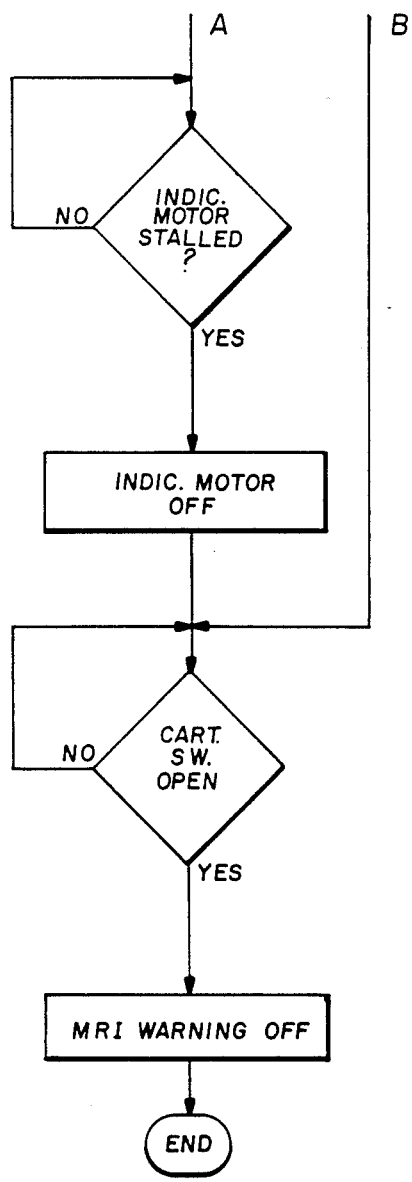

(3) Midroll Interrupt (MRI) Routine —FIGS. 21A and 21B

If in this routine the MRI switch 245 is closed because the user has manually depressed the MRI button, the MRI warning circuit 247 will be activated to alert the user of such condition, and the film transport means 209 will be operated in its rewind mode to energize the motor 213 to rewind all of the filmstrip F remaining outside the film cassette 1 into the cassette shell 3. Then, after the timer 265 has timed-out as in the exposure routine in FIG. 20B, the motor 213 will be de-energized. Since the MRI warning circuit 247 remains activated, the user is informed to remove the film cassette 1 from the loading chamber 207— assuming the load latch 319 is at "NO" because no exposure was made following the present film load, whereupon the circuit will be de-activated.

When in this routine the load latch 319 is at "YES" because at least one exposure was made following the present film load (rather than at "NO" because no exposure was made following the present film load), the motor 275 will be energized to rotate the drive ring 281 in the winding direction W to in turn rotate the status indicator 77 from its normal first or unexposed position to its second or partly exposed position—assuming the indicator was not moved earlier to its second position during a previous film load (in which instance the drive ring will not move the indicator). When the switching member 307 of the S (status) switch 309 is closed by the integral finger 301 of the drive ring 281, the motor 275 will be reversed via the bi-directional circuit 273 to rotate the drive ring in the unwinding direction U, leaving the indicator 77 in its second or partly exposed position. When the motor 275 is stalled because the integral finger 301 of the drive ring 281 abuts the stop wall 303 of the recess 305, the motor will be de-energized. Then, removal of the film cassette 1 from the loading chamber 207 will cause the MRI warning circuit 247 to be deactivated.

The invention has been described with reference to a preferred embodiment. However, it will be appreciated that variations and modifications can be effected with the ordinary skill in the art without departing from the scope of the invention. For example, the camera apparatus 201 could be modified to move the status indicator 77 from its normal first or unexposed position to its second or partly exposed position responsive to the first-available film frame #1 being exposed at the backframe opening 225. According to another example, the indicator 77 could have other positions in addition to its first, second, and third positions for providing exposure-related information or could have only the first and third positions, and the camera apparatus 201 could be modified to move the indicator to the available positions.

I claim:

1. A photographic camera to be used with a film cassette which can be operated to automatically thrust a filmstrip out of the cassette whether the filmstrip is generally unexposed or is substantially exposed and which has a film-exposure status indicator movable from an unexposed position for providing a visible indication that the filmstrip is generally unexposed to an exposed position for providing a visible indication that the filmstrip is substantially exposed, wherein said camera is characterized in that:

film transport means is activatible for operating the film cassette to thrust the filmstrip out of the cassette;

indicator sensing means senses whether the status indicator of the cassette is in its exposed position for determining whether the filmstrip is substantially exposed; and control means connects said transport means and said indicator sensing means for preventing activation of the transport means when the status indicator is in its exposed position, whereby the filmstrip will not be thrust out of the cassette in this instance.

2. A photographic camera as recited in claim 1, wherein a camera door can be opened and closed to insert the film cassette into and remove the film cassette from said photographic camera, door sensing means senses whether said camera door is open or closed, and said control means connects said film transport means and said door sensing means for preventing activation of the transport means when said camera door is open.

3. A photographic camera as recited in claim 1 or 2, wherein a loading chamber is adapted to receive the film cassette, cassette sensing means senses whether the film cassette is received in said loading chamber, and said control means connects said film transport means and said cassette sensing means for preventing activation of the transport means when the film cassette is not received in said loading chamber.

4. A photographic camera as recited in claim 1, wherein a loading chamber is adapted to receive the film cassette, warning means is connected to said indicator sensing means for alerting one that the film cassette is received in said loading chamber with its status indicator in the exposed position.

5. A photographic camera to be used with a film cassette which can be operated to automatically thrust a filmstrip out of the cassette whether the filmstrip is generally unexposed, partly exposed or substantially exposed and which has a film-exposure status indicator movable from an unexposed position for providing a visible indication that the filmstrip is generally unexposed, to a partly exposed position for providing a visible indication that the filmstrip is partly exposed, and to an exposed position for providing a visible indication that the filmstrip is substantially exposed, wherein said camera is characterized in that:

film transport means is activatible for operating the film cassette to thrust the filmstrip out of the cassette;

indicator sensing means senses whether the status indicator of the cassette is in its exposed position for determining whether the filmstrip is substantially exposed; and control means connects said transport means and said indicator sensing means for preventing activation of the transport means when the status indicator only is in its exposed position, whereby the filmstrip can be thrust out of the cassette when the status indicator only is in its unexposed or partly exposed position.

* * * * *

UNITED STATES PATENT AND TRADEMARK OFFICE
CERTIFICATE OF CORRECTION

PATENT NO. : 4,980,709

DATED : Dec. 25, 1990

INVENTOR(S) : J. David Cocca

It is certified that error appears in the above-identified patent and that said Letters Patent is hereby corrected as shown below:

| | |
|---|---|
| Col 1, line 15 | "LEAD" should read - -LOAD- - |
| Col 1, line 30 | "Particularly" should read - -particularly- - |
| Col 3, line 42 | "Providing" should read - -providing- - |
| Col 4, line 23 | "apParatus" should read - -apparatus- - |
| Col 7, line 15 | "groove 3" should read - -groove 93- - |
| Col 7, line 26 | "exposed" second occurrence should read as - -exposed.- - |
| Col 8, line 54 | "take-uP" should read - -take-up- - |

UNITED STATES PATENT AND TRADEMARK OFFICE
CERTIFICATE OF CORRECTION

PATENT NO. : 4,980,709

DATED : Dec. 25, 1990

INVENTOR(S) : J. David Cocca

It is certified that error appears in the above-identified patent and that said Letters Patent is hereby corrected as shown below:

Col 12, line 22    "Posi-" should read - -posi- -

Signed and Sealed this

Fourteenth Day of July, 1992

*Attest:*

DOUGLAS B. COMER

*Attesting Officer*     *Acting Commissioner of Patents and Trademarks*